(12) United States Patent
Budiarto et al.

(10) Patent No.: US 9,335,151 B2
(45) Date of Patent: May 10, 2016

(54) FILM MEASUREMENT

(71) Applicant: APPLIED MATERIALS, INC., Santa Clara, CA (US)

(72) Inventors: Edward W. Budiarto, Fremont, CA (US); Todd J. Egan, Fremont, CA (US); Dmitry A. Dzilno, Sunnyvale, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 530 days.

(21) Appl. No.: 13/662,330

(22) Filed: Oct. 26, 2012

(65) Prior Publication Data
US 2014/0117982 A1   May 1, 2014

(51) Int. Cl.
G01B 7/06   (2006.01)

(52) U.S. Cl.
CPC .................................. G01B 7/105 (2013.01)

(58) Field of Classification Search
None
See application file for complete search history.

(56) References Cited

U.S. PATENT DOCUMENTS

| | | | |
|---|---|---|---|
| 4,000,458 A | 12/1976 | Miller et al. | |
| 4,286,215 A | 8/1981 | Miller | |
| 4,727,322 A | 2/1988 | Lonchampt et al. | |
| 4,849,693 A | 7/1989 | Prince et al. | |
| 4,944,028 A | 7/1990 | Iijima et al. | |
| 5,223,793 A | 6/1993 | Ricci et al. | |
| 5,327,081 A | 7/1994 | Rudd et al. | |
| 5,373,235 A | 12/1994 | Clark, Jr. et al. | |
| 5,394,084 A | 2/1995 | Snyder | |
| 5,420,507 A | 5/1995 | Laskowski | |
| 5,541,510 A | 7/1996 | Danielson | |
| 5,552,704 A | 9/1996 | Mallory et al. | |
| 6,285,183 B1 | 9/2001 | Collingwood et al. | |
| 6,407,546 B1 | 6/2002 | Le et al. | |
| 6,549,006 B2 | 4/2003 | Le et al. | |
| 6,573,712 B2 | 6/2003 | Arai | |
| 6,593,737 B2 | 7/2003 | Crouzen et al. | |
| 6,657,427 B2 | 12/2003 | Aakerblom | |
| 6,741,076 B2 | 5/2004 | Le | |

(Continued)

FOREIGN PATENT DOCUMENTS

JP   2002-148011   5/2002
WO   WO 2011010108 A1 *   1/2011   ............... G01P 5/18

OTHER PUBLICATIONS

Abstract and Machine Translation of JP Publication No. 2002-148011, dated May 22, 2002, 43 pp.

(Continued)

*Primary Examiner* — Benjamin M Baldridge
*Assistant Examiner* — Courtney McDonnough
(74) *Attorney, Agent, or Firm* — Konrad Raynes Davda & Victor LLP

(57) ABSTRACT

In one embodiment, a sample is tested by an eddy current sensor at two distances separated by a known incremental distance. In one aspect, at least one of an unknown distance of the sensor from the test sample and the film thickness of the test sample may be determined as a function of a comparison of sensor output levels of a single parameter and the known incremental distance to calibration data. In yet another aspect, the distance between the sensor and the test sample may oscillated to produce an oscillating sensor output signal having an amplitude and mean which may be measured and compared to calibration data to identify at least one of the unknown film thickness of a conductive film on a test sample, and the unknown distance of the test sample from the sensor. Other aspects and features are also described.

42 Claims, 9 Drawing Sheets

(56) References Cited

U.S. PATENT DOCUMENTS

| | | |
|---|---|---|
| 6,756,794 B2 | 6/2004 | Slates |
| 6,762,604 B2 | 7/2004 | Le |
| 6,847,217 B2 | 1/2005 | Slates |
| 6,850,055 B2 | 2/2005 | Buttle |
| 6,933,718 B2 | 8/2005 | Collingwood et al. |
| 6,964,202 B2 | 11/2005 | Buttle et al. |
| 7,019,519 B2 | 3/2006 | Le |
| 7,215,117 B2 | 5/2007 | Buttle |
| 7,295,003 B2 | 11/2007 | Uyehara et al. |
| 7,830,140 B2 | 11/2010 | Tralshawala et al. |
| 2002/0149359 A1* | 10/2002 | Crouzen et al. ............... 324/229 |
| 2003/0067298 A1* | 4/2003 | Nagano et al. ................ 324/230 |
| 2004/0138838 A1 | 7/2004 | Scheiner et al. |
| 2005/0015209 A1 | 1/2005 | Wuebker |
| 2007/0163712 A1 | 7/2007 | Gotkis et al. |
| 2012/0272737 A1* | 11/2012 | Rudd et al. ...................... 73/597 |

OTHER PUBLICATIONS

International Search Report and Written Opinion for International Application No. PCT/US2013/065317, Feb. 12, 2014, 10 pp.

International Preliminary Report on Patentability for International Application No. PCT/US2013/065317, dated May 7, 2015, 7 pp.

\* cited by examiner

FILM MEASUREMENT

BACKGROUND

1. Field

The present description relates to methods, devices and computer program products for measurements of films of semiconductor devices and other substrates.

2. Description of Related Art

Semiconductor devices often include one or more thin conductive films. To facilitate the manufacture of such devices, it is often useful to measure the thickness of such films.

A variety of approaches have been proposed for measuring the thickness of a thin conductive film. One such approach utilizes an Eddy-Current Sensor (ECS) which operates in accordance with Faraday's law of induction and Lenz's law. FIG. 1 shows one example of such an ECS 10 which includes a coil 12 and a signal oscillator 14 such as alternating current (AC) signal source. The coil 12, driven by the oscillating signal source 14, generates an oscillating magnetic field 16 which induces circular electrical currents 20 inside a nearby conductive material 22 of a conductive film 24 of a test sample 26. The conductive film 24 is usually an electrically conductive metal. The induced eddy currents 20 in turn generate their own magnetic fields 30 which oppose the magnetic field 16 generated by the coil 12.

The interaction between the generated magnetic fields 16 and the induced magnetic fields 30 alters the complex impedance of the coil 12, which can be detected by a sensing circuit 40 (FIG. 2) connected to the coil 12. The output of the sensing circuit 40 may be interpreted by a computer or other computational device 42 to provide a useful measurement of film 24.

For example, the degree to which the complex impedance of the coil 12 is altered is typically a function of the strength of the magnetic fields 30 induced by the eddy currents 20. In turn, the strength of the induced eddy-currents 20 is a function of the electrical conductivity of the material 22 and the distance between the coil 12 and the material 22 of the film 24. When the thickness of the film 24 (as indicated by the arrows 50) is less than the penetration depth of the external magnetic field 16 (FIG. 1) at the driving frequency of the signal oscillator 14, the induced eddy-current 20 is also a function of the film material thickness 50.

Recently, an ECS sensor has been utilized as a metal film thickness measurement tool in the semiconductor industry. Thus, an ECS sensor has been used to measure the thickness of copper film deposited by an electro-plating process. However, the thickness measurement by an ECS sensor is often a function of the distance 52 between the coil 12 of the ECS sensor 10 and the film 24. This distance 52 is frequently referred to as the "lift-off" distance. Therefore, a reliable film thickness measurement may depend upon a good measurement of the lift-off distance.

One approach uses an independent displacement sensor, such as a capacitance probe or a laser triangulation sensor, to measure the lift-off distance 52 which is then relied upon by the computer 42 to compute a film thickness measurement of the film 24 based upon the outputs of the sensing circuit 40 and the independent lift-off distance measurements. This approach may have a drawback of higher complexity and cost associated with providing the independent displacement sensor. Moreover, in some implementations, there may be an additional disadvantage if the displacement sensor is mounted off axis from the ECS 10 such that the displacement sensor may not be measuring the same location on the sample 24 as the ECS 10.

Another approach attempts to compensate for an unknown lift-off distance 52 by using a sensing circuit 40 to detect both the real (resistance) and imaginary (inductive reactance) parts of the complex impedance of the coil 12 to calculate the film thickness 50 and distance 52 using an algorithm based upon iterative measurements. For example, one such sensing circuit 40 outputs both an amplitude signal and a phase signal which are a function of the complex impedance of the coil 12. The computer 42 calculates both a film thickness measurement and a lift-off measurement based upon iterative amplitude signal and phase signal outputs by the sensing circuit 40. Thus, an ECS sensor may be used as a distance or displacement sensor to measure the distance to a conductive surface.

ECS sensors are also used for other non-destructive testing of various objects. For example, ECS sensors may be used to inspect materials to detect cracks or other imperfections.

BRIEF DESCRIPTION OF THE DRAWINGS

Referring now to the drawings in which like reference numbers represent corresponding parts throughout.

SUMMARY

Figure 1:
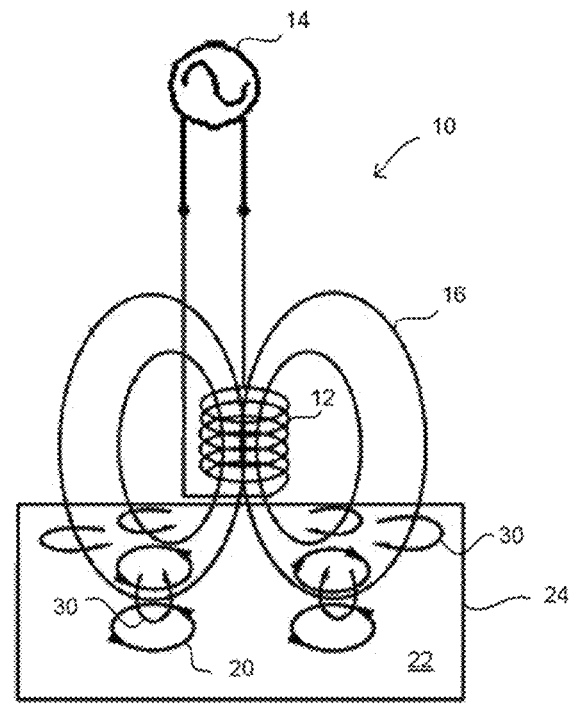
FIG. 1 illustrates a prior art eddy current sensor.
Figure 2:
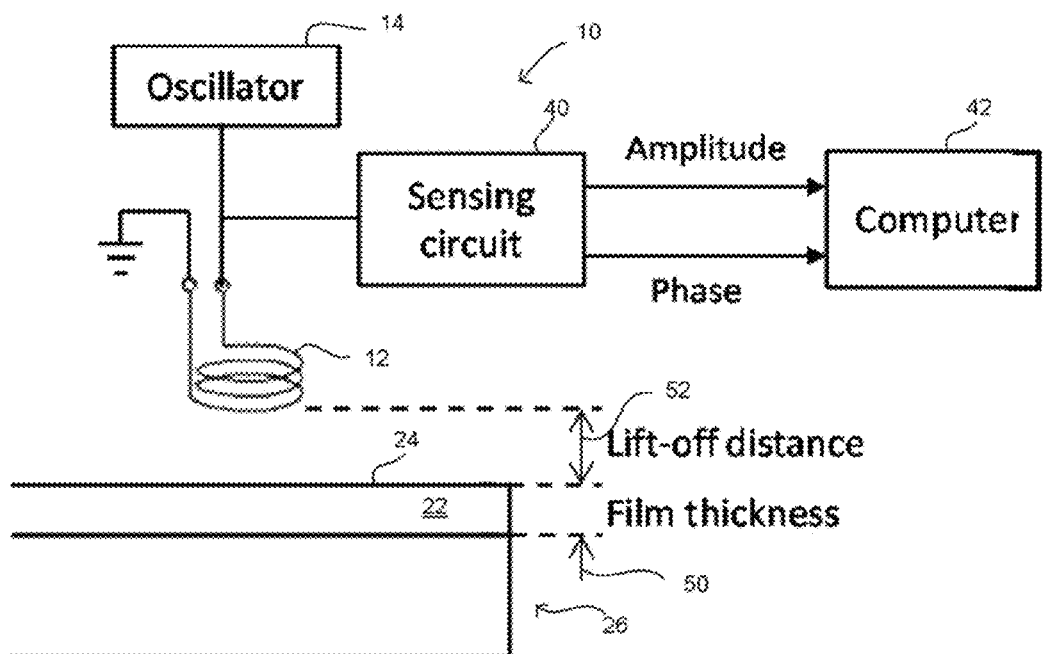
FIG. 2 illustrates a prior art eddy current sensor system.

One aspect of the present description is directed to measuring a lest sample having a film of unknown thickness, in which a test sample is sensed using an eddy current sensor at an unknown first distance from the test sample to generate eddy currents in the test sample to produce a sensor output signal of a single parameter at a first output level which is a function of the first unknown distance of the sensor from the test sample and the unknown thickness of the film of the test sample. The distance between the eddy current sensor and the test sample by a known incremental distance to a second unknown distance. The test sample is sensed again using the eddy current sensor at the second unknown distance from the test sample to generate eddy currents in the test sample to produce a sensor output signal of the single parameter at a second output level which is a function of the second unknown distance of the sensor from the test sample and the unknown thickness of the film of the sample. The sensor first and second output levels and the known incremental distance may be compared to calibration data correlating a plurality of measured output levels of a sensor output signal of the single parameter to a plurality of known thicknesses of films of a plurality of calibration samples and to a plurality of known distances of the calibration samples from an eddy current sensor. At least one of the unknown distances of the sensor from the test sample and the thickness of the film of the test sample may be determined as a function of the comparison of the first and second sensor output levels of the single parameter and the known incremental distance to the calibration data.

In another aspect, the lift-off distance of an eddy current sensor displaced at an unknown distance from a test sample having a film of unknown thickness may be oscillated so that the lift-off distance between the sensor and the sample oscillates. The test sample is sensed using the eddy current sensor to generate eddy currents in the sample while the lift-off distance oscillates to produce an oscillating sensor output signal. The oscillating sensor output signal is measured and the oscillating sensor output signal measurements are compared to calibration data. At least one of the unknown distances of the sensor from the sample and the thickness of the film of the sample may be determined as a function of the comparison of the oscillating sensor output signal measurements to calibration data.

Other aspects, features and embodiments are also described.

DETAILED DESCRIPTION OF THE
ILLUSTRATED EMBODIMENTS

In the following description, reference is made to the accompanying drawings which form a part hereof and which illustrate several embodiments of the present disclosure. It is understood that other embodiments may be utilized and structural and operational changes may be made without departing from the scope of the present description.

One aspect of the present description is directed to measuring the unknown thickness of a conductive film on a test sample. In addition, the unknown distance of the test sample from a sensor may also be measured. It is appreciated that aspects of the present description may be directed to other types of measurements.

In one embodiment, a test sample is sensed using an eddy current sensor at an unknown first distance from the test sample to generate eddy currents in the test sample to produce a sensor output signal of a single parameter at a first output level which is a function of the first unknown distance of the sensor from the test sample and the unknown film thickness of the test sample. For example, the single parameter sensor output signal may be representative of the resistance loss of the coil of the eddy current sensor as a result of its interaction with eddy currents induced in the conductive film of the test sample.

It is appreciated that in some applications, sensor data for multiple parameters such as a phase and amplitude of complex impedance may not be available in some applications. Hence, one aspect of the present description is directed to obtaining measurements based upon a single parameter sensor output. However, measurements based upon multiple parameter sensor outputs may also benefit from embodiments in accordance with the present description. Also, although resistance loss is described as an example of a single parameter sensor output, it is appreciated that other types of single parameter sensor outputs may be utilized, depending upon the particular application.

In another aspect, the distance between the eddy current sensor and the test sample is incremented by a known incremental distance to a second unknown distance. In addition, the test sample is again sensed using an eddy current sensor at the second unknown distance from the test sample to generate eddy currents in the test sample to produce a sensor output signal of the single parameter at a second output level which is a function of the second unknown distance of the sensor from the test sample and the unknown film thickness of the sample. Thus, in this embodiment, two sensor output levels may be generated for a single parameter at two different lift-off distances separated by a known incremental distance.

As used herein the term "incremental" refers to a change in the distance between the eddy current sensor and the test sample. The change may be positive or negative, and may bring the eddy current sensor and the test sample closer together or farther apart.

The sensor first and second output levels and the known incremental distance may be compared to calibration data correlating a plurality of measured output levels of a sensor output signal of the single parameter to a plurality of known film thicknesses of a plurality of calibration samples and to a plurality of known distances of the calibration samples from an eddy current sensor. In one embodiment, the calibration data includes a surface plot representing measured resistance loss values mapped versus associated data pairs. In the illustrated embodiment, each measured resistance value is the resistance loss value measured for a particular calibration sample of a known film thickness at a known distance of the calibration sample from the sensor. In addition, each measured resistance loss value may be mapped versus an associated data pair comprising the known film thickness and the known distance of the calibration sample measured to produce the associated measured resistance loss value.

For example, a first set of data pairs and associated resistance loss values of said calibration data may be generated by sensing a first calibration sample having a known, first constant film thickness using an eddy current sensor to generate eddy currents in the first calibration sample at a first plurality of known distances of the sensor from the first calibration sample to produce a first set of resistance loss values which are a function of the first plurality of distances of the sensor from the calibration sample and the known, first constant film thickness of the calibration samples. Similarly, a second set of data pairs and associated resistance loss values of said calibration data may be generated by sensing a second calibration sample having a known, second constant film thickness using an eddy current sensor to generate eddy currents in the second calibration sample at the first plurality of known distances of the sensor from the second calibration sample to produce a second set of resistance loss values which are a function of the first plurality of distances of the sensor from the calibration sample and the known, second constant film thickness of the samples.

In another aspect at least one of the unknown distances of the sensor from the test sample and the film thickness of die test sample may be determined as a function of the comparison of the first and second sensor output levels of the single parameter and the known incremental distance to the calibration data. In yet another aspect, the distance between the sensor and the test sample may be modified by oscillating the distance between the eddy current sensor and the sample. For example, the sensor or the test sample may be mounted on a physical oscillator such as a piezo-electric oscillator so that the distance between the eddy current sensor and the sample oscillates. As a result, the sensor output is an oscillating output which includes first and second output levels.

In one embodiment, the sensor oscillating output signal has an amplitude and mean which may be measured and compared to calibration data to identify at least one of the unknown film thickness of a conductive film on a test sample, and the unknown distance of the test sample from the sensor. The amplitude and mean of the sensor oscillating output signal for the test sample may be compared to the amplitude and mean of sensor oscillating output calibration signals measured for various calibration samples, each having a known film thickness and distance to an eddy current sensor.

Figure 3:
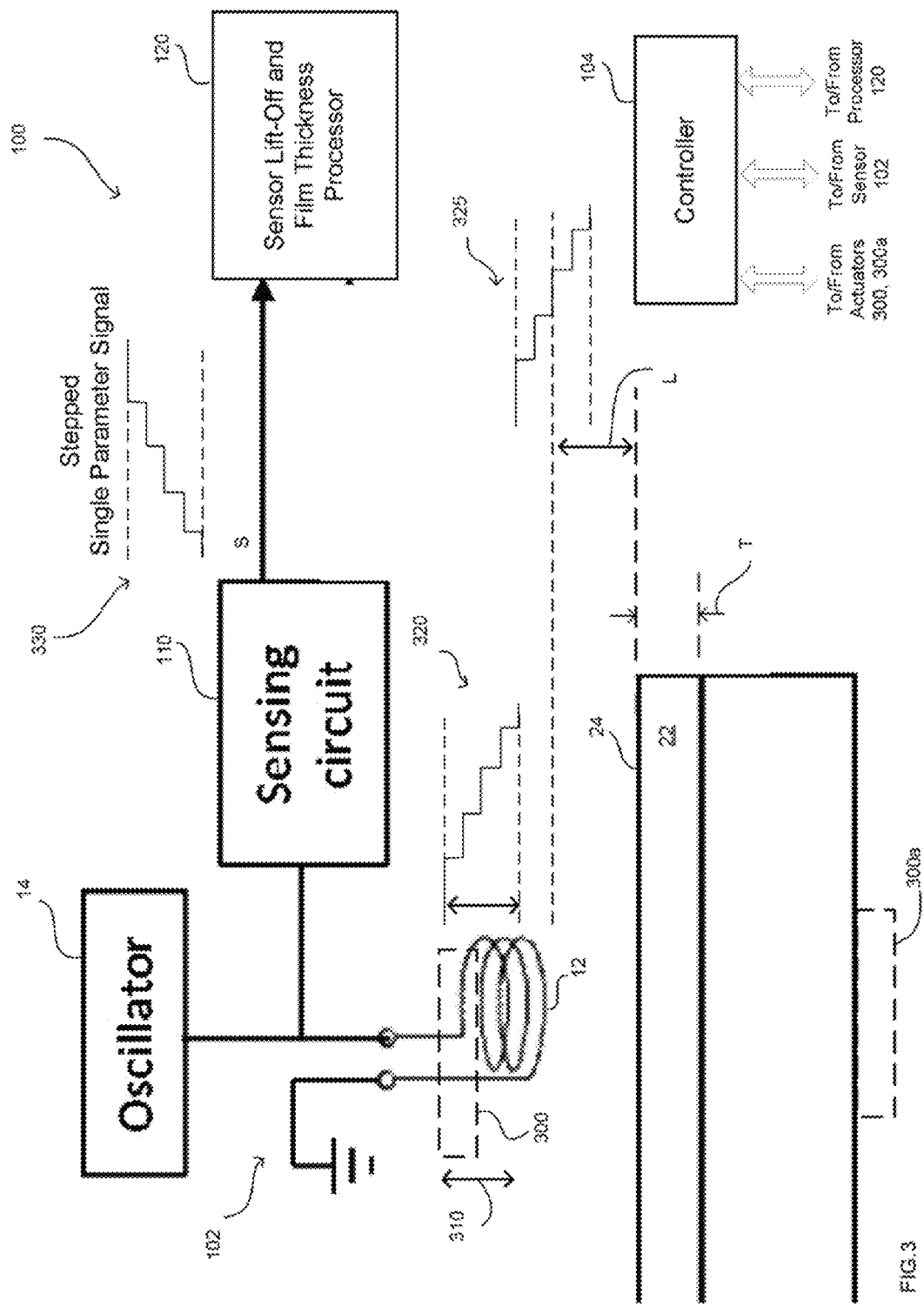
FIG. 3 illustrates one embodiment of an eddy current sensor system in which aspects of the description provided herein may be embodied.

FIG. 3 shows one example of an Eddy-Current Sensor (ECS) system 100 in accordance with an embodiment of the present description. The sensor system 100 operates in accordance with Faraday's law of induction and Lenz's law, and includes an ECS sensor 102 having a coil 12 and a signal oscillator 14 such as alternating current (AC) signal source. The electromagnetic interaction between an AC-driven coil and a conductive object such as a test sample, through the generation of eddy-currents inside the object, is typically influenced by multiple variables. These variables include the coil-to-sample distance, AC frequency of the coil driver signal, the coil geometry and dimensions, the electrical conductivity of the object's material, and in the case of film samples, the thickness of the film, particularly in those instances in which the thickness is less than the penetration depth of the electromagnetic field. In a typical application involving film thickness measurements, the frequency, coil geometry and dimensions, and film conductivity are usually unchanged. As a result, the variable of distance and film thickness are often the primary variables affecting the coil-sample interaction.

In this embodiment, the coil 12 and oscillator 14 are controlled by a controller 104. In the illustrated embodiment, the coil 12 may be driven by the oscillator 14 at a frequency in the range of 1 kHz to 10 MHz, for example. However, it is appreciated that particular frequency utilized may depend upon the specific application including film thickness range, material properties, lift-off distance restrictions, etc.

The coil 12, driven by the oscillating signal source 14, generates an oscillating magnetic field which induces circular electrical currents inside a nearby conductive material 22 of a conductive film 24 of a test sample 26. The film 24 is an electrically conductive metal deposited on a semiconductor device, in this example. The induced eddy currents in turn generate their own magnetic fields which oppose the magnetic field generated by the coil 12. It is appreciated that the sensor system 100 may be used with other electrically conductive films in addition to conductive metal films.

The interaction between the generated magnetic fields and the induced magnetic fields alters the complex impedance of the coil 12. The alteration of the complex impedance can be detected by a sensing circuit 110 coupled to the coil 12 and controlled by the controller 104. In this example, the sensing circuit 110 outputs a single parameter output signal S such as resistance loss, as a function of the altered complex impedance. It is appreciated that sensor system 100 may have other types of single and multiple parameter sensing circuits, depending upon the particular application. The output S of the sensing circuit 110 may be interpreted by a processor or other computational device 120 controlled by the controller 104, to provide a useful measurement for film 24. The output S may be in analog or digital form. If in analog form, the processor 120 may include suitable analog to digital conversion circuitry. In the illustrated embodiment, the resistance loss signal is measured in units of millivolts. It is appreciated that other units of measurement may be utilized depending upon the particular application.

The degree to which the complex impedance of the coil 12 is altered is typically a function of the strength of the magnetic fields induced by the eddy currents in the film 14. In turn, the strength of the induced eddy-currents 20 is a function of the electrical conductivity of the material 22 and the lift-off distance L between the coil 12 and the material 22 of the film 24. When the film thickness T of the film 24 (as indicated by the arrows) is less than the penetration depth of the external magnetic field at the driving frequency of the signal oscillator 14, the induced eddy-current is also a function of the material film thickness T.

Figure 4:
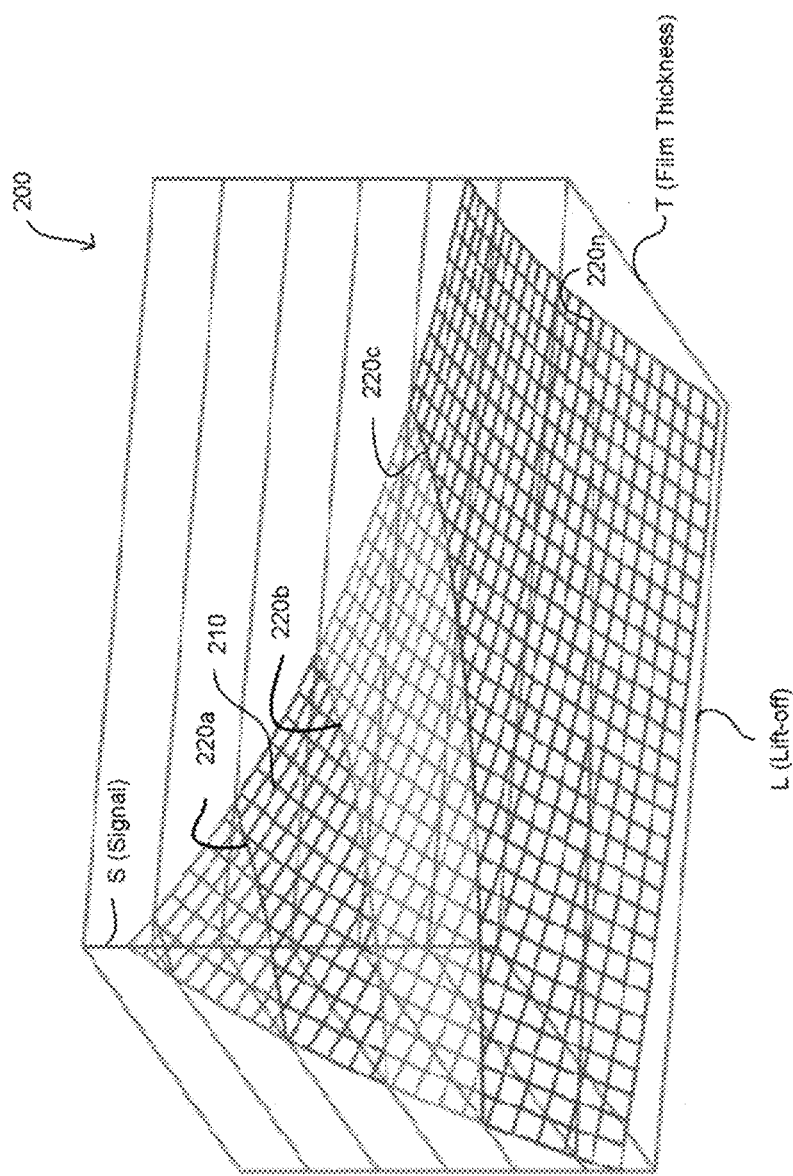
FIG. 4 illustrates one example of calibration data which may be collected in accordance with one aspect of the present description.

In accordance with one aspect of the present description, at least two unknown values such as lift-off distance L and the film thickness T of the film 24 may be determined by comparing the signal S output of the sensing circuit 110 to previously obtained calibration data resulting from calibration of the sensor system 100. FIG. 4 shows one example of a three-dimensional plot 200 of calibration data which may be obtained for the sensor system 100.

The surface plot 200 depicts various values plotted in three orthogonal dimensions, the L-axis, T-axis and the S-axis. In this example, measured resistance loss signal values S are plotted on the S-axis versus associated L, T data pairs plotted in the L-T plane defined by the L-axis and T-axis. In the illustrated embodiment, each measured resistance value plotted on the S-axis is the resistance loss value (S value) measured for a particular calibration sample of a known film thickness (T value) at a known lift-off distance (L value) of the calibration sample from the sensor. Thus, each measured resistance loss value (S value) is correlated or mapped versus an associated L, T data pair comprising the known film thickness (T value) and the known lift-off distance (L value) of the calibration sample measured to produce the associated measured resistance loss signal value (S value). In the illustrated embodiment, the film thickness, incremental distances and liftoff distances are measured in units of microns. It is appreciated that other units of measurement may be utilized, depending upon the particular application.

For example, a first set of L, T (lift-off, film thickness) data pairs and associated S (resistance loss) values of calibration data may be generated by sensing a first calibration sample having a known, first constant film thickness $T_a$ using the eddy current sensor system 100 to generate eddy currents in the first calibration sample at a first plurality of known lift-off distances $L_1, L_2, L_3 \ldots L_n$ of the sensor from the first calibration sample to produce a first set of resistance loss values $S_{a1}, S_{a2}, S_{a3}, \ldots S_{an}$ winch are a function of the first plurality of distances $L_1, L_2, L_3 \ldots L_n$ of the sensor from the calibration sample and the known, first constant film thickness $T_a$ of the calibration samples.

Similarly, a second set of L, T (lift-off, film thickness) data pairs and associated S (resistance loss) values of calibration data may be generated by sensing a second calibration sample having a known, second constant film thickness $T_b$ using the eddy current sensor system 100 to generate eddy currents in the second calibration sample at the first plurality of known lift-off distances $L_1, L_2, L_3 \ldots L_n$ of the sensor from the second calibration sample to produce a second set of resistance loss values $S_{b1}, S_{b2}, S_{b3}, \ldots S_{bn}$ which are a function of the first plurality of distances $L_1, L_2, L_3 \ldots L_n$ of the sensor from the calibration sample and the known, second constant film thickness $T_b$ of the calibration sample.

Calibration data may continue to be gathered using additional calibration samples, each having a film of a known film thickness value T, and sensed at various known liftoff distances $L_1, L_2, L_3 \ldots L_n$ of the sensor system 100 from each calibration sample to generate additional sets of resistance loss S values which are each a function of the particular liftoff distance $L_1, L_2, L_3 \ldots L_n$ of the sensor system 100 from the particular calibration sample and the particular known film thickness T value of the particular calibration sample.

In one embodiment, calibration data may be collected by sensing different calibration samples having different known film thicknesses at the same common set of known lift-off distances $L_1, L_2, L_3 \ldots L_n$. It is appreciated that different calibration samples having different known film thicknesses may also be sensed at different sets of known lift-off distances, to collect calibration data, depending upon the particular application.

As shown in FIG. 4, in the illustrated embodiment, the collected measured resistance loss (S) values plotted on the S-axis versus associated lift-off, film thickness (L, T) data pairs plotted in the L-T plane defined by the L-axis and T-axis, define a three-dimensional contoured surface 210 defined by contour lines 220a, 220b, 220c ... 220n of constant measured resistance loss value. Thus, the contour line 220a may represent the contour of the measured resistance loss surface plot 200 in which the measured resistance loss value along contour line 220a is a constant 7000 millivolts, for example. Similarly, the contour line 220b may represent the contour of the measured resistance loss surface plot 200 in which the measured resistance loss value along contour line 220b is a constant 6500 millivolts, for example.

Figure 5:
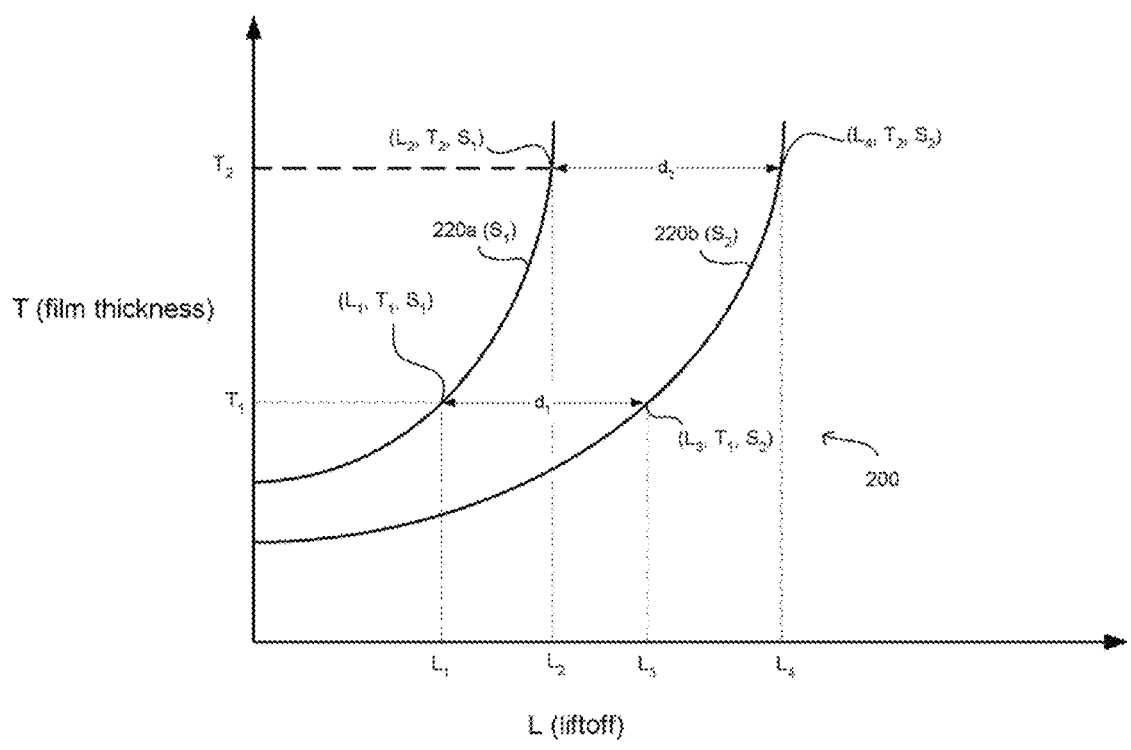
FIG. 5 illustrates one example of analysis of the calibration data of FIG. 4 in accordance with one aspect of the present description.

FIG. 5 shows the constant measured resistance loss value contour lines 220a, 220b projected into the lift-off, film thickness (L, T) plane of FIG. 4. As shown therein, a first calibration data point $(L_1, T_1, S_1)$ along the constant measured resistance loss value contour lines 220a, represents a first resistance loss value $S_1$, measured for a calibration sample having a known film thickness $T_1$ at a known lift-off distance $L_1$. A second calibration data point $(L_2, T2_1, S_1)$ along the same contour line 220a of constant measured resistance loss $S_1$, represents the same resistance loss value $S_1$, measured for a second calibration sample having a second known film thickness $T_2$ at a second known lift-off distance $L_2$. A third calibration data point $(L_4, T_2, S_1)$ along the constant measured resistance loss value contour lines 220b, represents a second resistance loss value $S_2$, measured for the first calibration sample having a known film thickness $T_1$ at a third known lift-off distance $L_3$. A fourth calibration data point $(L_4, T_2, S_1)$ along the same contour line 220b of constant measured resistance loss $S_2$, represents the same resistance loss value $S_2$, measured for the second calibration sample having the second known film thickness $T_2$ at a fourth known lift-off distance $L_4$.

As shown in FIG. 5, the difference in lift-off distances between the calibration data point $(L_3, T_1, S_2)$ along the constant measured resistance loss value contour line 220b of constant measured resistance loss $S_2$, and the calibration data point $(L_1, T_1, S_1)$ along the constant measured resistance loss value contour line 220a of constant measured resistance loss $S_1$, is represented by an incremental distance $d_1 = L_3 - L_1 1$. Similarly, the difference in lift-off distances between the calibration data point $(L_4, T_2, S_1)$ along the constant measured resistance loss value contour line 220b of constant measured resistance loss $S_2$, and the calibration data, point $(L_2, T2, S_1)$ along the constant measured resistance loss value contour line 220a of constant measured resistance loss $S_1$, is represented by an incremental distance $d_2 = L_4 - L_2$.

Although the illustrated embodiment depicts the calibration data as graphical plots representing the collected calibration data, it is appreciated that the calibration data may be stored and accessed in other forms. For example, the calibration data may be stored in a processor 120 as one or more data structures comprising lists or arrays of calibration data values in formats suitable for computer processing.

Figure 6:
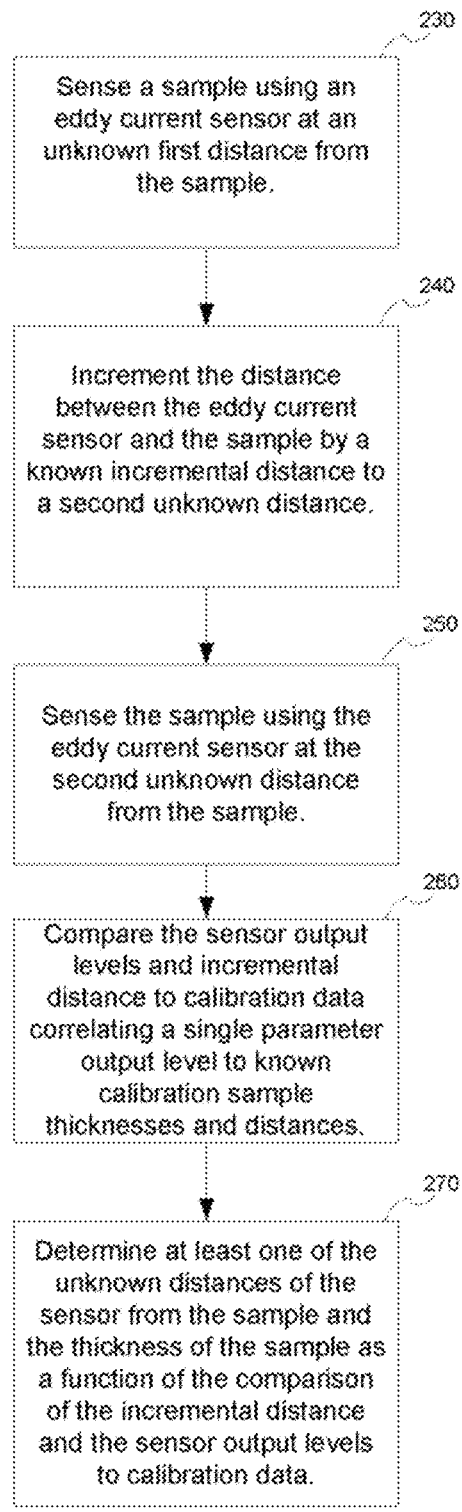
FIG. 6 illustrates one example of operations for computing film thickness and lift-off distance for a test sample using the eddy current sensor of FIG. 3.

In accordance with one aspect of the present description, the differential lift-off distance values $d_1, d_2, d_3 \ldots d_n$ between constant measured resistance loss value contour lines 220a, 220b, 220c, ... 220n of calibration data may be used to determine unknown film thicknesses and unknown lift-off distances in film measurements using the sensor system 100. FIG. 6 shows an example of operations to determine at least one of film thickness and measurement lift-off distance using a sensor system such as the sensor system 100 and calibration data such as the calibration data depicted in FIGS. 4, 5 as a measured resistance loss surface plot 200, for example.

In a first operation, a test sample having a conductive film of an unknown film thickness is sensed (block 230) using an eddy current sensor such as the sensor of the sensor system 100, for example, at a first unknown lift-off distance from the test sample. The sensor system 100 generates eddy currents in the test sample 26 to produce a sensor output signal of a single parameter at a first output level which is a function of the first unknown distance of the sensor from the test sample 26 and the unknown film thickness of the test sample 26. In the illustrated embodiment, the single parameter output signal is output by the sensing circuit 110 and is a measure of the resistance loss induced in the coil 12. Thus, in this example, the sensing circuit 110 may output a measured resistance loss value of $S_1$, for example, when measuring the test sample 26 having a conductive film of unknown film thickness at an unknown lift-off distance between the film 24 and the coil 12 of the sensor system 100.

In another operation, the lift-off distance between the eddy current sensor and the test sample is incremented (block 240) by a known incremental distance to a second unknown lift-off dance distance. In the illustrated embodiment, the sensor system 100 includes an actuator 300 which can be operated by the controller 104 to linearly displace the position of the coil 12 relative to the film 24 of the test sample 26. The linear actuator 300 may be any suitable linear actuator including stepper motors or staging motors to control the movement of the coil 12 relative to the film 24.

The actuator 300 displaces the relative position of the coil 12 in a direction 310 orthogonal to the plane of the film 24. FIG. 3 includes a plot 320 which depicts the relative position of the coil 12 along the direction 310 as a function of time. Thus, in this example, the change in the relative position of the coil 12 along the direction 310 each time the lift-off distance is incremented, is a stair step function, in which the size of each step is known. A plot 325 depicts the change in lift-off distance L along the direction 310 as a function of time as the relative position of the coil 12 is incremented. Thus, in this example, the change in the lift-off distance L along the direction 310 each time the lift-off distance is incremented, is a stair step function, in which the size of each step is known. It is appreciated that the lift-off distance may be changed in other methods, to produce other lift-off change functions, depending upon the particular application.

Although the actuator 300 is depicted as moving the coil 12, it is appreciated that in other embodiments, the position of the test sample may be moved either alone or in combination with movement of the coil, to increment the distance between the coil and the film of the test sample. Thus, a suitable actuator 300 may be coupled to the coil 12 or to the test sample 26, or to both, depending upon the particular application, to increment the distance between the coil and the film of the test sample 26.

Also, as used herein, the term "incremental" is directed to a change in the lift-off distance between the eddy current sensor and the test sample. The change may be positive or negative, and may bring the eddy current sensor and the test sample closer together or farther apart. Thus, the term "increment" is directed to movements which either increase or decrease the distance between the coil and the test film.

Furthermore, although the actuator 300 is depicted as moving the coil 12 linearly in a direction 310 orthogonal to the surface of the film 24, it is appreciated that in other embodiments, the distance between the coil 12 and the film 24 may be incremented in directions other than orthogonal, such as diagonal, for example, and other than linearly such as in a curved motion, for example. Still further, although the coil 12 is depicted as being positioned directly over the film 24, it is appreciated that in other embodiments, the position of the coil 12 may be laterally offset with respect to the film 24 of the test sample 26.

Following incrementing (block 240) the distance between the eddy current sensor and the test sample by a known incremental distance to a second unknown lift-off distance, the same test sample is again sensed (block 250) using the eddy current sensor at the second unknown distance from the test sample. Again, eddy currents are generated in the test sample to produce a sensor output signal of the single parameter at a second output level which is a function of the second unknown distance of the sensor from the test sample and the unknown film thickness of the sample. Thus, in this example, the sensing circuit 110 may output a measured resistance loss value of $S_2$, for example, when measuring the test sample 26 having a conductive film of unknown thickness at a second unknown lift-off distance between the film 24 and the coil 12 of the sensor system 100. Graph 330 is a plot depicting one example of the change in the level of the measured resistance loss value S each time the lift-off distance is incremented. Thus, in this example, the change in the level of the measured resistance loss value S each time the lift-off distance is incremented is a stair step function. It is appreciated that the lift-off distance may be changed in other methods, to produce other output signal change functions, depending upon the particular application.

In another operation, the sensor first and second output levels and the known incremental distance are compared (block 260) to calibration data correlating a plurality of measured output levels of a sensor output signal of the single parameter to a plurality of known film thicknesses of a plurality of calibration samples and to a plurality of known distances of the calibration samples from an eddy current sensor. In this example, the first and second output levels are the first and second measured resistance loss values $S_1$ and $S_2$, obtained at sensing operations 230 and 250, respectively. Hence, the measured resistance loss value $S_1$ falls on the contour line 220a (FIGS. 4, 5) of constant measured resistance loss $S_1$, and the measured resistance loss value $S_2$ falls on the contour line 220b of constant measured resistance loss $S_2$.

It is seen by inspecting FIG. 5 that if the lift-off distance between the eddy current sensor and the test sample is incremented (block 240) by a known incremental distance equal to incremental distance $d_1$ to the second unknown lift-off dance distance, it may be determined that the two calibration points winch include the two measured resistance loss values $S_1$ and $S_2$, and that are separated by the incremental lift-off distance $d_1$, are the two calibration data points $(L_1, T_1, S_1)$ and $(L_3, T_1,$ $S_2)$. Thus, it is determined that the thickness of the conductive film of the test sample has the thickness value $T_1$ and the lift-off distances at the sensing operations 230 and 250 was $L_1$ and $L_3$ respectively. Similarly, it is seen by inspecting FIG. 5 that if the lift-off distance between the eddy current, sensor and the test sample is incremented (block 240) by a known incremental distance equal to incremental distance $d_2$ to the second unknown lift-off distance, it may be determined that the two calibration points which include the two measured resistance loss values $S_1$ and $S_2$, and that are separated by the incremental lift-off distance $d_2$, are the two calibration data points $(L_2, T_2, S_1)$ and $(L_4, T_2, S_2)$. Thus, it is determined that the thickness of the conductive film of the test sample has the thickness value $T_2$ and the lift-off distances at the sensing operations 230 and 250 were $L_2$ and $L_4$, respectively. In this manner, at least one of the unknown distances of the sensor from the test sample and the film thickness of the test sample may be determined (block 270) as a function of the comparison of the first and second sensor output levels of the single parameter and the known incremental distance to the calibration data.

Thus, a sample having a conductive film with an unknown film thickness T placed at an unknown distance $L_1$ from the sensor can produce a single output signal $S_1$. However, a single measurement of $S_1$ correlates or maps to numerous pairs of L and T along the contour line 220a of constant measured resistance loss $S_1$ according to the calibration plot in FIGS. 4 and 5. If the test sample is moved to another unknown distance $L_2$ but by a known step or incremental distance, such as 100 microns, for example, a second output signal $S_2$ can be collected. There are now two signals $S_1$ and $S_2$, and still two unknowns $L_1$ and T, since $L_2=L_1+100$ (or $L_2=L_1-100$). The unknown film thickness T and lift-off distance $L_1$ can then be solved using any number of well-known look-up table algorithms.

In the illustrated embodiment, the constant measured resistance loss value contour lines 220a, 220b, 220c, . . . 220n of calibration data include test data points obtained by testing and data points obtained by calculation, which are calculated by interpolation between and among test data points. It is appreciated that calibration data may be collected and generated in other methods, depending upon the particular application.

One application of this measurement, method in accordance with the present description, is to place the test sample at a relatively far distance (such as a few millimeters (mm) for example) from the coil 12. The test sample 26 and coil are then brought closer to each other by known incremental steps (where each incremental step is for example 100 microns). After each incremental step, the signal S output by the sensing circuit 110 is measured and a look-up algorithm is executed by the processor 120 to determine film thickness and lift-off distance. It is believed that the film thickness and lift-off distance may be accurately measured in as few as two lift-off positions separated by the known incremental distance. However, in some applications, accuracy may be improved by incrementing the lift-off distance many times, and running the algorithm to determine the film thickness and lift-off distance at each incremental step. Moreover, the process may be continued until a predetermined nominal lift-off distance is reached.

Figure 7:
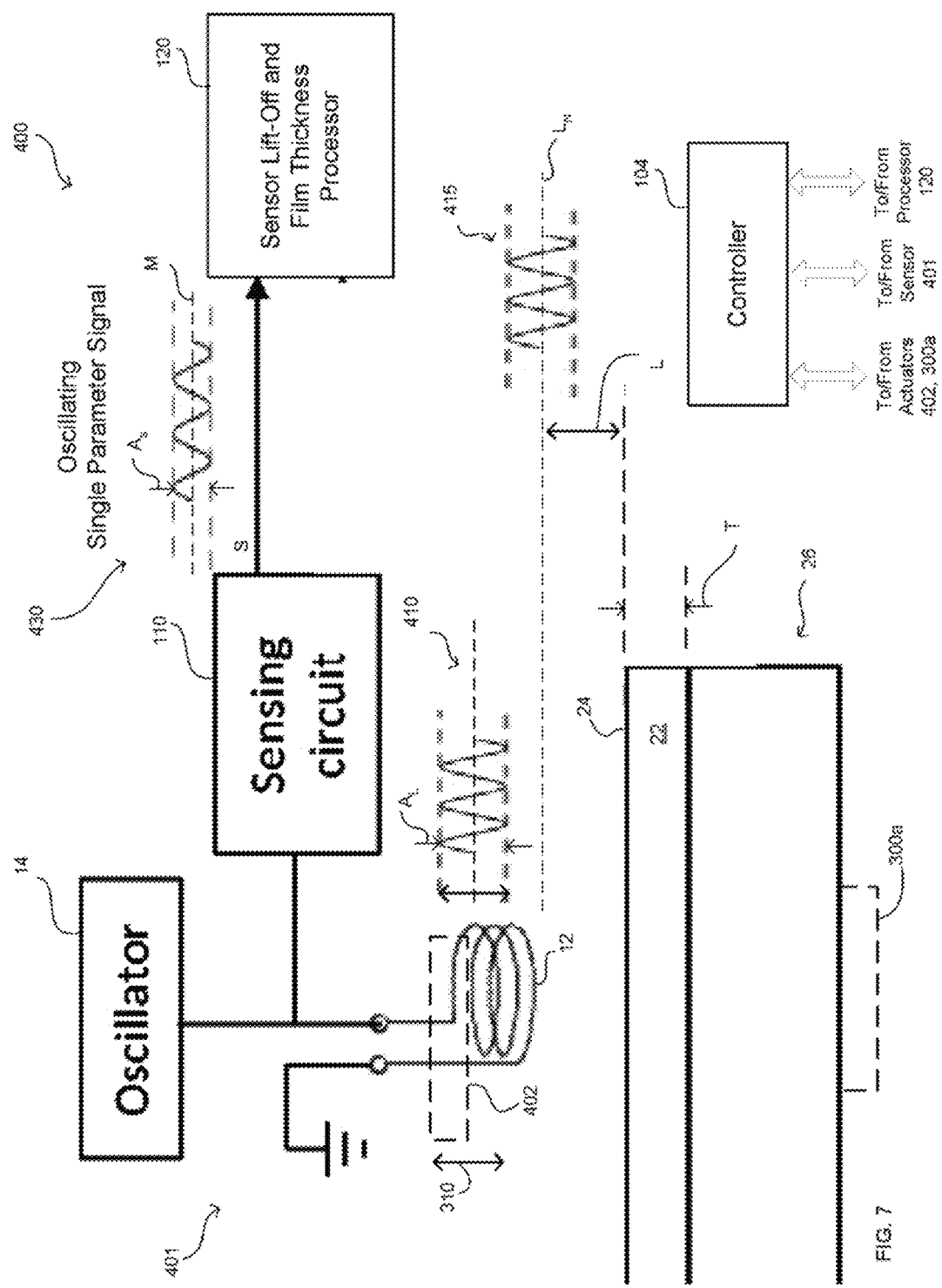
FIG. 7 illustrates another embodiment of an eddy current sensor system in which aspects of the description provided herein may be embodied.

In the embodiment, of FIG. 3, the sensor system 100 includes an actuator 300 which can be operated to change the lift-off distance between the coil 12 and the film 24 of the test sample 26. In this example, the lift-off distance L between the coil 12 and the film 24 is changed in incremental steps. FIG. 7 illustrates another embodiment of an eddy current sensor system 400, in which the coil 12 of an ECS sensor 401 is mounted on an oscillating actuator 402, such as a piezoelectric transducer, for example. The oscillating actuator 402 controlled by the controller 104, oscillates the position of the coil 12 at a fixed frequency and a fixed amplitude $A_L$ around a nominal coil position, as depicted in the plot 410 which depicts the position of the coil 12 along the direction 310 as a function of time.

Although the actuator 402 is depicted as oscillating the coil 12, it is appreciated that in other embodiments, the position of the test sample 26 may be oscillated either alone or in combination with oscillation of the coil, to oscillate the distance between the coil and the film of the test sample. Thus, a suitable actuator 300a, 402 may be coupled to the coil 12 or to the test sample 26, or to both, depending upon the particular application, to oscillate the distance between the coil and the film of the test sample 26, under the control of the controller 104.

Furthermore, although the actuators 300a, 402 are depicted as moving the coil 12 and test sample 26 relative to each other linearly in a direction 310 orthogonal to the surface of the film 24, it is appreciated that in other embodiments, the distance between the coil 12 and the film 24 may be oscillated in directions other than orthogonal, such as diagonal, for example, and other than linearly such as in a curved motion, for example. Still further, although the coil 12 is depicted as being positioned directly over the film 24, it is appreciated that in other embodiments, the position of the coil 12 may be laterally offset with respect to the film 24 of the test sample 26.

A plot 415 depicts the resulting change in lift-off distance L along the direction 310 as a function of time as the position of the coil 12 (or test sample 26) oscillates. Thus, in this example, the change in the lift-off distance L along the direction 310 as the coil (or test sample 26) position oscillates is a sinusoidal function in which the lift-off distance L oscillates around a nominal lift-off distance $L_N$. The change in the lift-off distance L represented by the sinusoidal function is at the frequency and the amplitude $A_L$ of the oscillator actuator 402. In this manner, the lift-off distance L may be oscillated, it is appreciated that the lift-off distance may be changed in other periodic functions, to produce other lift-off change functions, such as saw-tooth functions, for example, depending upon the particular application.

In accordance with one aspect of the present description, oscillating the lift-off distance can produce an oscillating eddy current sensor output signal S output by a sensing circuit 110. FIG. 7 includes a plot 430 depicting one example of an oscillating single parameter signal such as an oscillating measured resistance loss value S as the lift-off distance is oscillated. Thus, in this example, the change in the level of the measured resistance loss value S as the lift-off distance oscillates is a sinusoidal function. It is appreciated that other periodic change functions of the eddy current sensor output signal may be produced, depending upon the particular application.

Figure 8:
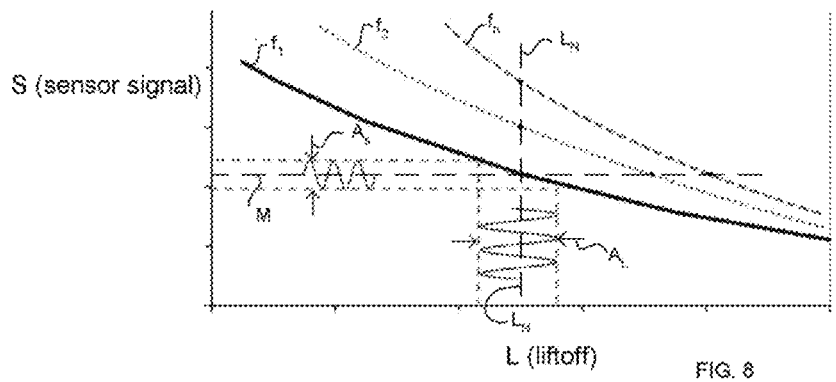
FIG. 8 illustrates an aspect of collecting calibration data for the eddy current sensor of FIG. 7 in accordance with one aspect of the present description.

FIG. 8 is a graph illustrating a function $f_1$ between lift-off distance L and the measured resistance loss value S for a calibration sample having a known film thickness $T_1$. Similarly, FIG. 8 illustrates functions $f_2$ and $f_n$ between lift-off distance L and the measured resistance loss value S for calibration samples having a known film thicknesses $T_2$ and $T_n$, respectively. Oscillating the lift-off distance for a calibration sample having a known film thickness around a nominal lift-off distance $L_N$, at the frequency and the amplitude $A_L$ of the oscillator actuator 402, produces an oscillating measured resistance loss value S having an amplitude $A_S$ and a mean value M of the oscillating measured resistance loss value S.

In accordance with one aspect of the present description, it is believed that a sample having a conductive film of a certain thickness placed at a certain nominal lift-off distance $L_N$ from the coil produces a unique pair of values of the signal amplitude $A_S$ and signal mean M of the oscillating eddy current sensor output signal S output by the sensing circuit 420, as the lift-off distance L oscillates. For example, it is seen that the amplitude $A_S$ of the oscillating measured resistance loss value S, for a calibration sample as the lift-off distance L is oscillated by the oscillator actuator 402 around a nominal lift-off distance $L_N$, at the frequency and the amplitude $A_L$ of the oscillator actuator 402, is a function of the slope of the function f for that sample at the nominal lift-off distance $L_N$. For example, as shown in FIG. 8, the smaller the slope of the associated function f, the smaller the amplitude $A_S$ of the oscillating measured resistance loss value S.

Moreover, it is believed that the functions $f_1, f_2, \ldots f_n$ for the various samples are not linear or parallel. More particularly, it is believed that the slopes of the functions $f_1, f_2, \ldots f_n$ at any particular measured resistance loss value S, differ from each other. Hence, should test samples having functions such as the functions $f_1, f_2, \ldots f_n$ for example, produce oscillating measured resistance loss values having the same particular value of the mean M, it is believed that the test samples may nonetheless be distinguished on the basis of the differing values of the amplitude $A_S$ of the oscillating measured resistance loss value S produced for each such test sample. Conversely, should test samples having functions such as the functions f, $f_2, \ldots f_n$ for example, produce oscillating measured resistance loss values having the same the values of the amplitude $A_S$, it is believed that the test samples may nonetheless be distinguished on the basis of the differing values of the mean M of the associated oscillating measured resistance loss values S produced for each such test sample.

Accordingly, it is believed that a sample having a conductive film of a certain thickness placed at a certain nominal lift-off distance $L_N$ from the coil produces a unique pair of values of the signal amplitude $A_S$ and signal mean M of the oscillating eddy current sensor output signal S output by the sensing circuit 420, as the lift-off distance L oscillates. Accordingly, calibration data may be collected for a plurality of calibrations samples having a known film thickness, and placed at a known nominal lift-off distance $L_N$ from the coil. Thus, when testing samples having an unknown film thickness and placed at unknown nominal lift-off distance $L_N$ from the coil, a suitable look up table algorithm may then be used with the calibration data to determine both the thickness of the film of the test sample and the nominal lift-off distance $L_N$ from the coil.

Figure 9:
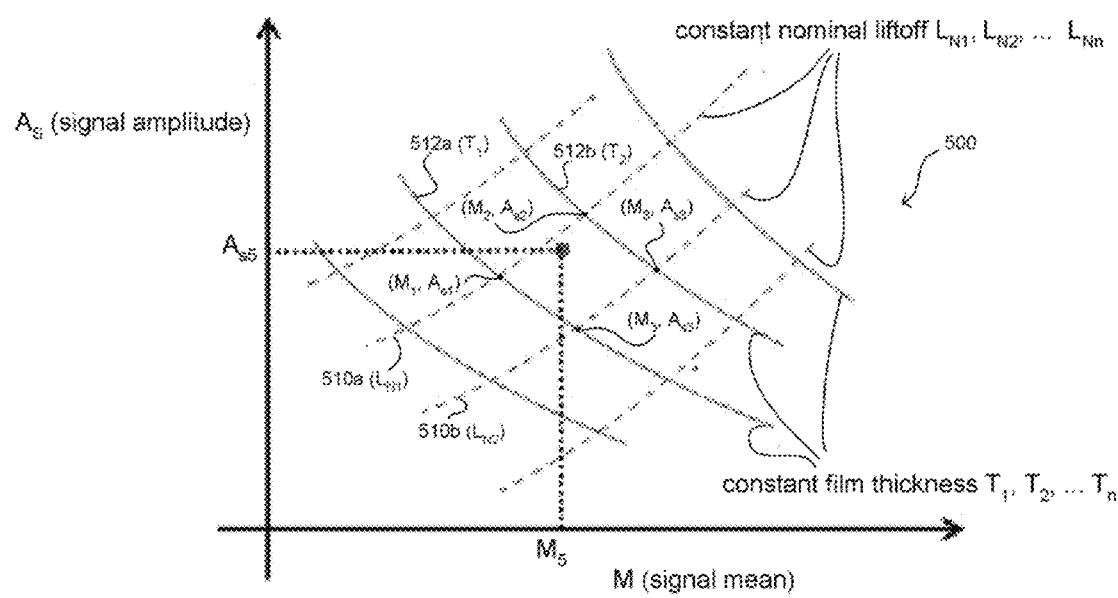
FIG. 9 illustrates another example of calibration data which may be collected for the eddy current sensor of FIG. 7 in accordance with one aspect of the present description.

FIG. 9 shows one example of a two-dimensional plot 500 of calibration data which may be obtained for the sensor system 400. The plot 500 depicts various values plotted in two orthogonal dimensions, the oscillating signal mean (M) on the M-axis, and the oscillating signal amplitude ($A_S$) on the $A_S$-axis. In this example, data pairs comprising an oscillating measured resistance loss signal mean value M and an oscillating measured resistance loss signal amplitude $A_S$ are plotted in the M-$A_S$ plane defined by the M-axis and $A_S$-axis, respectively. In the illustrated embodiment, each measured oscillating signal mean value M and oscillating signal amplitude $A_S$ (M, $A_S$) data pair is measured for a particular calibration sample of a known film thickness (T value) at a known nominal lift-off distance ($L_N$ value) of the calibration sample from the sensor. Thus, each measured M, $A_S$ data pair has an associated $L_N$, T data pair comprising the known film thickness (T value) and the known nominal lift-off distance ($L_N$ value) of the calibration sample measured to produce the associated measured (M, $A_S$) data pair.

For example, a first set of M, $A_S$ data pairs and associated $L_N$, T (nominal lift-off, film thickness) data pairs of calibration data may be generated by sensing a first calibration sample having a known, first constant film thickness $T_a$ using the oscillating eddy current sensor system 400 to generate eddy currents in the first calibration sample at a first plurality of known nominal lift-off distances $L_{N1}$, $L_{N2}$, $L_{N3}$ ... $L_{Nn}$ of the sensor from the first calibration sample to produce a first set of M, $A_S$ data pairs ($M_{a1}$, $A_{Sa1}$), ($M_{a2}$, $A_{Sa2}$), ($M_{a3}$, $A_{Sa3}$), ... ($M_{an}$, $A_{San}$), which are a function of the first plurality of nominal lift-off distances $L_{N1}$, $L_{N2}$, $L_{N3}$ ... $L_{Nn}$ of the sensor from the calibration sample and the known, first constant, film thickness $T_a$ of the calibration samples.

Similarly, a second set of M, $A_S$ data pairs and associated $L_N$, T (nominal lift-off, film thickness) data pairs of calibration data may be generated by sensing a second calibration sample having a known, second constant film, thickness $T_b$ using the oscillating eddy current sensor system 400 to generate eddy currents in the second calibration sample at the first plurality of known nominal lift-off distances $L_{N1}$, $L_{N2}$, $L_{N3}$ ... $L_{Nn}$ of the sensor from the first calibration sample to produce a second set of M, $A_S$ data pairs ($M_{b1}$, $A_{Sb1}$), ($M_{b2}$, $A_{Sb2}$), ($M_{b3}$, $A_{Sb3}$), ... ($M_{bn}$, $A_{Sbn}$), which are a function of the first plurality of nominal lift-off distances $L_{N1}$, $L_{N2}$, $L_{N3}$ ... $L_{Nn}$ of the sensor from the calibration sample and the known, second constant film thickness $T_b$ of the calibration samples.

Calibration data may continue to be gathered using additional calibration samples, each having a film of a known film thickness value T, and sensed at various known nominal lift-off distances $L_{N1}$, $L_{N2}$, $L_{N3}$ ... $L_{Nn}$ of the oscillating sensor system 400 from each calibration sample to generate additional sets of M, $A_S$ data pairs which are each a function of the particular nominal liftoff distance $L_{N1}$, $L_{N2}$, $L_{N3}$ ... $L_{Nn}$ of the sensor system 400 from the particular calibration sample and the particular known film thickness T value of the particular calibration sample.

In one embodiment, calibration data may be collected by sensing different calibration samples having different, known film thicknesses at the same common set of known nominal lift-off distances $L_{N1}$, $L_{N2}$, $N3$ ... $L_{Nn}$. It is appreciated that different calibration samples having different known film thicknesses may also be sensed at different sets of known nominal liftoff distances, to collect calibration data, depending upon the particular application.

As shown in FIG. 9, in the illustrated embodiment, the collected measured resistance loss M, $A_S$ data pair values are plotted in the M-$A_S$ plane defined by the M-axis and the $A_S$-axis. The associated $L_N$, T (nominal lift-off, film thickness) data pairs are correlated or mapped by superimposing them on the associated measured resistance loss M, $A_S$ data pair values, as a set of constant nominal lift-off lines 510a, 510b ... , and a set of constant film thickness lines 512a, 512b, ... . Thus, the constant nominal lift-off line 510a is superimposed on all M, $A_S$ data pair values which were measured using the constant nominal lift-off value $L_{N1}$, for example. Similarly, the constant nominal lift-off line 510b is superimposed on all M, $A_S$ calibration data, pair values which were measured using the constant nominal lift-off value $L_{N2}$, for example. The constant film thickness lines 512a is superimposed on all calibration M, $A_S$ data pair values which were measured using a calibration sample having a constant film thickness of $T_1$, for example. Similarly, the constant, film thickness lines 512b is superimposed on all calibration M, $A_S$ data pair values which were measured using a calibration sample having a constant film thickness of $T_2$, for example.

Thus, a first calibration data point ($M_1$, $A_{S1}$), along the constant nominal lift-off line 510a and along the constant film thickness line 512a, represents a first oscillating measured resistance loss signal mean value $M_1$ and an oscillating measured resistance loss signal amplitude $A_{S1}$, measured for a calibration sample having a known film thickness $T_1$ at a known nominal lift-off distance $L_{N1}$. A second calibration data point ($M_2$, $A_{S2}$), along the same constant nominal, lift-offline 510a, represents the a second oscillating measured resistance loss signal mean value $M_2$ and an oscillating measured resistance loss signal amplitude $A_{S2}$, measured for a calibration sample having a known film thickness $T_2$ at the same known nominal lift-off distance $L_{N1}$. A third calibration data point ($M_3$, $A_{S3}$), along the same constant film thickness line 512a as the first calibration data point ($M_1$, $A_{S1}$), represents a third oscillating measured resistance loss signal mean value $M_3$ and an oscillating measured resistance loss signal amplitude $A_{S3}$, measured for a calibration sample having a known film thickness $T_1$ at the known nominal lift-off distance $L_{N2}$. A fourth calibration data point ($M_4$, $A_{S4}$), along the same constant film thickness line 512b as the second calibration data point ($M_2$, $A_{S2}$), and along the same constant nominal lift-off distance line 510b as the third calibration data point ($M_3$, $A_{S3}$), represents a fourth oscillating measured resistance loss signal mean value $M_4$ and an oscillating measured resistance loss signal amplitude $A_{S4}$, measured for a calibration sample having a known film thickness $T_2$ at the known nominal lift-off distance $L_{N2}$.

Calibration data points along the same constant film thickness line 512a may be collected by sensing a calibration sample having a known film thickness such as film thickness $T_1$ at a first known lift-off distance $L_{N1}$, and then moving the calibration sample to the next lift-off distance and repeating the sensing operation. This may be accomplished for example by incrementing the Sift-off distance by a known incremental value (positive or negative) using a suitable linear actuator 300a, for example. Alternatively, the lift-off distance may be separately measured at each sensing lift-off position using any suitable independent lift-off distance measuring technique known or subsequently developed.

Although the illustrated embodiment depicts the calibration data of FIG. 9 as graphical plots representing the collected calibration data, it is appreciated that the calibration data may be stored and accessed in other forms. For example, the calibration data may be stored in suitable storage for the processor 120 as one or more data structures comprising lists or arrays of calibration data values in formats suitable for computer processing.

Figure 10:
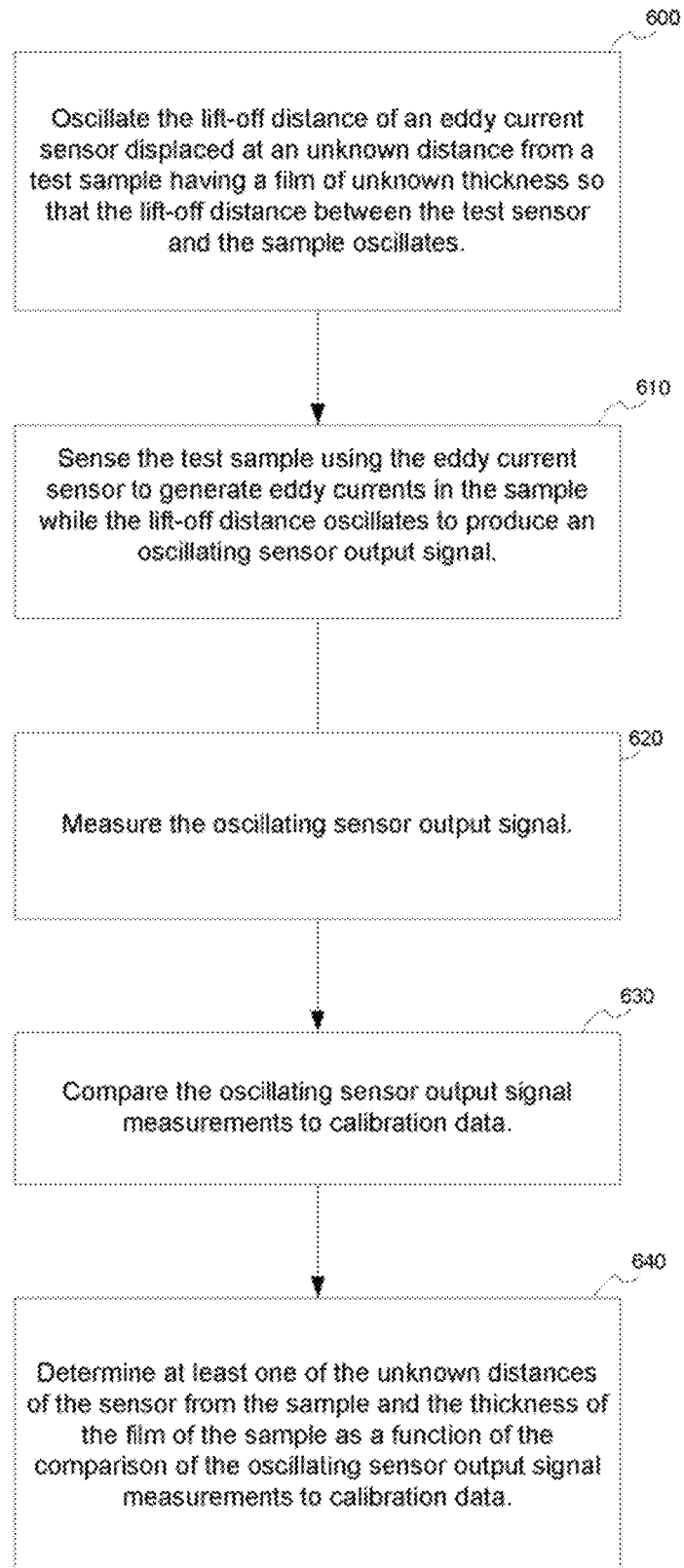
FIG. 10 illustrates one example of operations for computing film thickness and lift-off distance for a test sample using the eddy current sensor of FIG. 7.

FIG. 10 shows an example of operations to determine at least one of film thickness and nominal lift-off distance for a test sample having an unknown film thickness and unknown lift-off distance, using a sensor such as the sensor 401 and calibration data such as the calibration data depicted in FIG. 9 as a measured resistance loss oscillating signal mean and amplitude plot 500, for example.

In a first operation, the lift-off distance of an eddy current sensor displaced at an unknown distance from a test sample having a film of unknown thickness is oscillated (block 600) so that the lift-off distance between the test sensor and the sample oscillates. In another operation, the test sample is sensed (block 610) using the eddy current sensor to generate eddy currents in the sample while the lift-off distance oscillates to produce an oscillating sensor output signal. The oscillating sensor output signal may be measured (block 620), In the illustrated embodiment, the signal amplitude $A_S$ and signal mean M of the oscillating eddy current sensor output signal S output, by the sensing circuit 420, may be measured by suitable detection and measurement circuitry of the processor 120 as the lift-oft-distance L oscillates.

The oscillating sensor output signal measurements may be compared (block 620) to calibration data. In the illustrated embodiment, the signal amplitude $A_S$ and signal mean M of the oscillating eddy current sensor output signal S output by the sensing circuit 420, may be compared to the calibration data plotted in the graph of FIG. 9, for example. In the example of FIG. 9, the signal amplitude $A_S$ and signal mean M measured for the test sample are depicted as the data pair ($M_5$, $A_{S5}$), for example.

On the basis of the comparison, at least one of the unknown distance of the sensor from the sample and the thickness of the film of the sample may be determined (block 630) as a function of the comparison of the oscillating sensor output signal measurements to calibration data. For example, the unknown film thickness T and unknown nominal lift-off distance L for the test sample can then be solved using any number of well-known look-up table algorithms.

For example, in the illustrated embodiment, if the signal amplitude $A_{S5}$ and signal mean $M_5$ measured for the test sample match the corresponding signal amplitude $A_S$ and signal mean M measured for a calibration sample having a known film thickness T at the known nominal lift-off distance $L_N$, then the film thickness T and the nominal lift-off distance $L_N$ will be determined to be the same as the known film thickness T at the known nominal lift-off distance $L_N$ for the matching calibration sample. Alternatively, if the signal amplitude $A_{S5}$ and signal mean $M_5$ measured for the test sample is between adjacent calibration data pairs such as calibration data, pairs ($M_1$, $A_{S1}$), ($M_2$, $A_{S2}$), ($M_3$, $A_{S3}$), ($M_4$, $A_{S4}$), then the film thickness T and the nominal lift-off distance $L_N$ of the test sample may be interpolated to values between the known film thickness values and the known nominal lift-off distance values associated with the calibration data points $M_1$, $A_{S1}$), ($M_2$, $A_{S2}$), ($M_4$, $A_{S4}$).

In the illustrated embodiment of FIGS. 9, 10, the calibration data was collected and the test samples were tested while the oscillating actuator 402 controlled by the controller 104, oscillates the position of the coil 12 and hence the change in lift-off distance L at a fixed frequency and a fixed amplitude $A_L$ around a nominal coil position, as depicted in the plot 410 which depicts the position of the coil 12 along the direction 310 as a function of time. In this manner, the lift-off distance L is oscillated as a function of the actuator oscillation, frequency and amplitude $A_L$. However, it is appreciated that additional sets of calibration data may be collected at other frequencies and amplitudes of the oscillating actuator and lift-off distance, and the test samples tested at those other actuator frequencies and amplitudes, depending upon the particular application.

For example, it is believed that the measurement sensitivity of the sensor system 400 may be increased or decreased, as appropriate, by increasing or decreasing the oscillating actuator amplitude $A_L$ and hence the lift-off distance oscillation amplitude. Thus, a series of different plots 500$_1$, 500$_2$, . . . 500$_n$. of calibration data similar to the plot 500 of FIG. 9, may each be collected at a different oscillating actuator amplitude $A_{L1}$, $A_{L2}$, . . . $A_{Ln}$ (and hence a different lift-off distance oscillation amplitude). The test samples may then be tested at one or more of the different oscillating actuator amplitudes $A_{L1}$, $A_{L2}$, . . . $A_{Ln}$, and compared to one or more of the appropriate plots 500$_1$, 500$_2$, . . . 500$_n$, of calibration data collected at the same oscillating actuator amplitude at which the sample was tested.

Accordingly, a plot 500$_1$ of calibration data similar to the plot 500 of FIG. 9, may be collected at a particular oscillating actuator amplitude $A_{L1}$. The test samples may then be tested at the same oscillating actuator amplitude $A_{L1}$ and compared to the plot 500$_1$ of calibration data, collected at the same oscillating actuator amplitude $A_{L1}$ as the sample was tested. Similarly, a plot 500$_2$ of calibration data similar to the plot 500 of FIG. 9, may be collected at a different oscillating actuator amplitude $A_{L2}$. The test samples may then be tested at the oscillating actuator amplitude $A_{L2}$ and compared to the plot 500$_2$ of calibration data collected at the same oscillating actuator amplitude $A_{L2}$ as the samples were tested. Thus, the oscillating actuator test amplitude selected for testing a test sample may be selected from a plurality of different oscillating actuator calibration amplitudes $A_{L1}$, $A_{L2}$, . . . $A_{Ln}$, for which calibration data has been or will be collected. Thus, one or more oscillating actuator test amplitudes (and hence one or more oscillating lift-off distance amplitudes) may be selected for testing a particular test sample to increase accuracy or alter sensitivity as appropriate for the particular test sample.

It is seen from the above that real-time measurements of both film thickness and lift-off distance may be made in applications in which only one output parameter such as resistance loss is available. Thus, in those applications in which the lift-off distance is oscillated, incrementing the lift-off distance for multiple separate measurements at different lift-off distances may be obviated.

Figure 11:
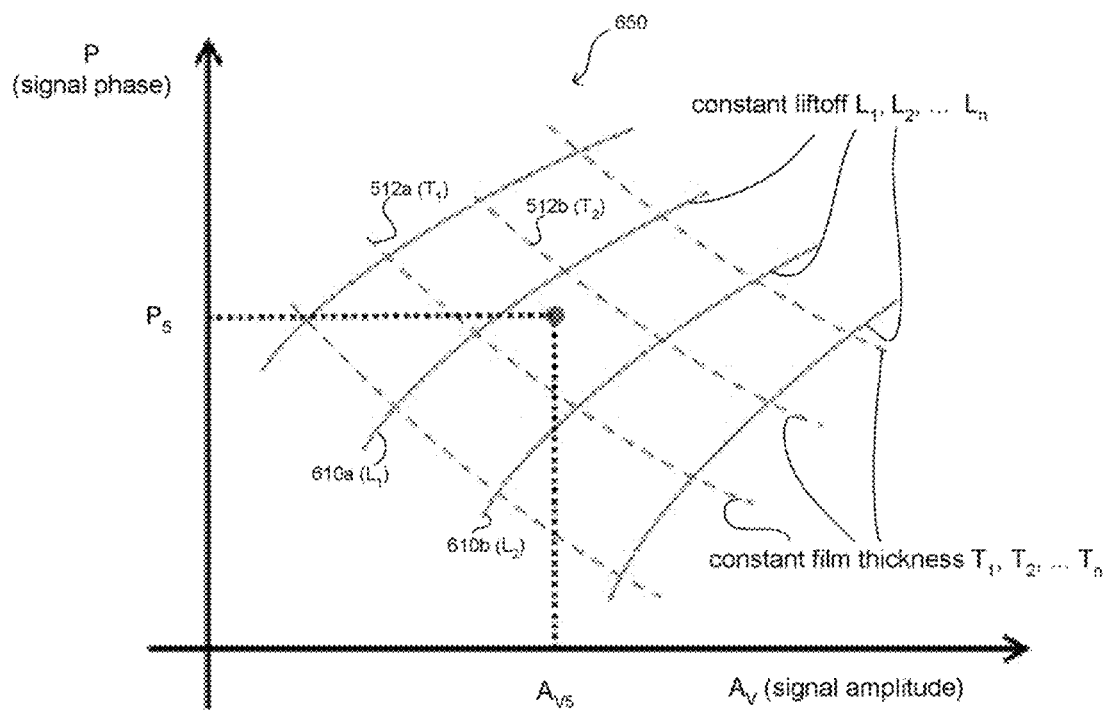
FIG. 11 illustrates another example of calibration data which may he collected for an eddy current sensor in accordance with one aspect of the present description.

FIG. 11 shows an example of a two-dimensional plot 650 of calibration data which may be obtained for a sensor system in accordance with another aspect of the present description, instead of sensing the mean and amplitude of an oscillating output signal, the complex impedance of a n on oscillating coil 12 in the presence of a conductive film 24, is measured by circuit techniques such as an impedance bridge or a phase locked loop circuit to provide signals representing the phase P and amplitude $A_V$ of the voltage across the coil 12, which are representative of the complex impedance of the coil 12.

The plot 650 depicts various values plotted in two orthogonal dimensions, the voltage signal phase (P) on the P-axis, and the voltage signal amplitude ($A_V$) on the $A_V$-axis. In this example, data pairs comprising a measured voltage phase signal P and a measured voltage amplitude $A_V$ are plotted in the P-$A_V$ plane defined by the P-axis and $A_V$-axis, respectively. In the illustrated embodiment, each, measured voltage signal value P and voltage signal amplitude $A_V$ (P, $A_V$) data pair is measured for a particular calibration sample of a known film thickness (T value) at a known lift-off distance (L value) of the calibration sample from the sensor. Thus, each measured P, $A_V$ data pair has an associated L, T data pair comprising the known film thickness (T value) and the known lift-off distance (L value) of the calibration sample measured to produce the associated measured (P, $A_V$) data pair.

As shown in FIG. 11, in the illustrated embodiment, the collected measured coil voltage P, $A_V$ data pair values are plotted in the P-$A_V$ plane defined by the P-axis and the $A_V$-axis. The associated L, T (lift-off film thickness) data pairs are mapped by superimposing them on the associated measured resistance loss P, $A_V$ data pair values, as a set of constant lift-off lines 660a, 610b . . . , and a set of constant film thickness lines 612a, 612b, . . . . Thus, the constant lift-offline 610a is superimposed on all P, $A_V$ data pair values which were measured using the constant lift-off value $L_1$, for example. Similarly, the constant lift-off line 610b is superimposed on all P, $A_V$ calibration data pair values which were measured using the constant lift-off value $L_2$, for example. The constant film thickness lines 612a is superimposed on all calibration P, $A_V$ data pair values which were measured using a calibration sample having a constant film thickness of $T_1$, for example. Similarly, the constant film thickness lines 612b is superimposed on all calibration P, $A_V$ data pair values which were measured using a calibration sample having a constant film thickness of $T_2$, for example.

In a manner similar to that described above, the voltage sensor output signal measurements may be compared to calibration data. In the illustrated embodiment, the voltage signal amplitude $A_V$ and signal P of the eddy current sensor output signals output by a sensing circuit of an eddy current sensor, may be compared to the calibration data plotted in the graph of FIG. 11, for example. In the example of FIG. 11, the signal amplitude $A_V$ and signal phase P measured for the test sample are depicted as the data pair ($P_5$, $A_{V5}$), for example.

On the basis of the comparison, at least one of the unknown distance of the sensor from the sample and the thickness of the film of the sample may be determined as a function of the comparison of the voltage sensor output signal measurements to calibration data. For example, the unknown film thickness X and unknown lift-off distance L for the test sample can then be solved using any number of well-known look-up table algorithms.

For example, in the illustrated embodiment, if the signal amplitude $A_{S5}$ and signal $P_5$ measured for the test sample match the corresponding signal amplitude $A_V$ and signal P measured for a calibration sample having a known film thickness T at the known lift-off distance L, then the film thickness T and the lift-off distance L will be determined to be the same as the known film thickness T at the known lift-off distance L for the matching calibration sample. Alternatively, if the signal amplitude $A_{S5}$ and signal $P_5$ measured for the test sample is between adjacent calibration data pairs, then the film thickness T and the lift-off distance L of the test sample may be interpolated to values between the known film thickness values and the known lift-off distance values associated with the calibration data points. In this manner, both incrementing and oscillating may be obviated in applications having multiple parameter ECS outputs such as voltage phase and voltage amplitude.

Additional Embodiment Details

Various aspects of the present description may be embodied as a device, system, method or computer program product. These aspects may take the form of hardware, software or a combination thereof. A computer program product may be embodied in a one or more computer readable storage media having computer readable code stored therein. A computer readable storage medium may be a magnetic storage medium such as a hard drive, for example, an electronic storage medium such as random access memory or flash memory, for example, or optical memory such as optical disks, or any other tangible medium on which program code may be stored for execution by a processor. In certain embodiments, the sensor embodiments may be embodied in a computer system Including a video controller to render information to display on a monitor coupled to a computer system comprising a desktop, workstation, server, mainframe, laptop, handheld computer, etc. Alternatively, the sensor embodiments may be embodied in a computing device that does not include a video controller, such as an embedded controller, a controller sensor, etc.

The illustrated operations show certain events occurring in a certain order. In alternative embodiments, certain operations may be performed in a different order, modified or removed. Moreover, operations may be added to the above described operations and still conform to the described embodiments. Further, operations described herein may occur sequentially or certain operations may be processed in parallel.

Figure 12:
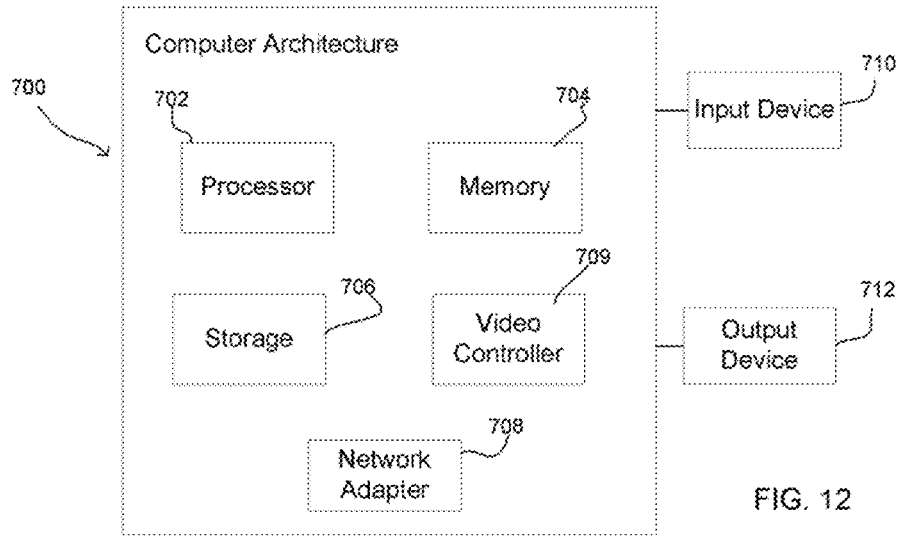
FIG. 12 illustrates a computing environment in which aspects of the description provided herein may be embodied.

FIG. 12 illustrates one embodiment of a computer architecture 700 which can operate with components, such as those of the sensor system 100 shown in FIG. 3 or FIG. 7. The computer architecture 700 provides one example of a computer which includes the functions of the controller 104 and the film thickness and sensor lift-off processor 120 of the sensor systems 100, 400. In other embodiments, the functions of the sensor systems such as those of the controller 104 and the film thickness and sensor lift-off processor 120, for example, may be embodied in separate computing devices.

The architecture 700 may include a processor 702 (e.g., a microprocessor), a memory 704 (e.g., a volatile memory device), and storage 706 (e.g., a non-volatile storage, such as magnetic disk drives, optical disk drives, a tape drive, etc.). The processor 702 may be mounted on a motherboard, for example. The storage 706 may comprise an internal storage device or an attached or network accessible storage. Programs in the storage 706 are loaded into the memory 704 and executed by the processor 702 in a manner known in the art or subsequently developed. The programs may, among other functions, control the various devices of the sensor system and compare the sensor data to the calibration data stored in the storage 706 to identify characteristics of the test samples such as film thickness and lift-off distance, as described herein.

The architecture former includes a network adapter 708 to enable communication with a network, such as an Ethernet, a Fibre Channel Arbitrated Loop, etc. Further, the architecture may, in certain embodiments, include a video controller 709 to render information on a display monitor, where the video controller 709 may be embodied on a video card or integrated on integrated circuit components mounted on the motherboard. Certain of the devices may have multiple cards or controllers.

One or more input devices 710 may be used to input sensor signals to the processor 702. Such sensor input signals may include digital sensor signals or analog sensor signals output from sensing circuitry such as the circuitry 110. One input device 710 may include suitable circuitry to convert analog signals to digital signals and provide them to the processor 702. An input device 710 may also include an ECS sensor, actuators and sensing circuitry of the sensor system in accordance with the description provided herein.

An input device 710 may also provide user input to the processor 702, and may include a keyboard, mouse, pen-stylus, microphone, touch sensitive display screen, or any other activation or input mechanism known in the art or subsequently developed. An output device 712 is capable of rendering information transmitted from the processor 702, or other component, such as a display monitor, printer, storage, etc.

The network adapter 708 or other devices described herein may be mounted on an expansion card, such as a Peripheral Component interconnect (PCI) card, PCI-express or some other I/O expansion card coupled to a motherboard, or on integrated circuit components mounted on the motherboard. Thus, sensor embodiments may be embodied in computer systems or other systems in which a sensor in accordance with the present description is mounted on one or both of a motherboard and an expansion card. Accordingly, in some system embodiments, the system may lack an expansion card, and a sensor in accordance with the present description may be mounted on a motherboard. In another system embodiment, a sensor in accordance with the present description may be mounted on an expansion card but not on a motherboard.

The foregoing description of various embodiments has been presented for the purposes of illustration and explanation. It is not intended to be exhaustive or to limit to the precise form disclosed. Many modifications and variations are possible in light of the above teaching.

What is claimed is:

1. A method of measuring a test sample having a film of unknown thickness, comprising:
    sensing the test sample using an eddy current sensor at an unknown first distance from the test sample to generate eddy currents in the test sample to produce a sensor output signal of a single parameter at a first output level which is a function of the first unknown distance of the sensor from the test sample and the unknown thickness of the film of the test sample;
    incrementing the distance between the eddy current sensor and the test sample by a known incremental distance to a second unknown distance;
    sensing the test sample using the eddy current sensor at the second unknown distance from the test sample to generate eddy currents in the test sample to produce a sensor output signal of the single parameter at a second output level which is a function of the second unknown distance of the sensor from the test sample and the unknown thickness of the film of the sample;
    comparing the sensor first and second output levels and the known incremental distance to calibration data correlating a plurality of measured output levels of a sensor output signal of the single parameter to a plurality of known thicknesses of films of a plurality of calibration samples and to a plurality of known distances of the calibration samples from an eddy current sensor; and
    determining at least one of the unknown distances of the sensor from the test sample and the thickness of the film of the test sample as a function of the comparison of the first and second sensor output levels of the single parameter and the known incremental distance to the calibration data.

2. The method of claim 1 further comprising continuing to increment the distance between the eddy current sensor, sensing the test sample using the eddy current sensor to produce another output signal of the single parameter at another output level at each incremented distance, comparing the sensor output levels at each incremented distance to the calibration data, determining the distance of the sensor from the test sample at each incremented distance, until the distance between the test sample and the sensor is determined to be at a predetermined distance.

3. The method of claim 1 wherein the single parameter is the resistance loss of a coil of the eddy current sensor as a result of interaction between the coil and the sample.

4. The method of claim 3 wherein the calibration data includes data representing a mapping of measured resistance loss values versus associated data pairs, each measured resistance value being the resistance loss value measured for a particular calibration sample of a known thickness at a known distance of the calibration sample from the sensor, each measured resistance loss value being mapped versus an associated data pair comprising the known thickness and the known distance of the calibration sample measured to produce the associated measured resistance loss value.

5. The method of claim 4 wherein a first set of data pairs and associated resistance loss values of said calibration data is generated by sensing a first calibration sample having a known, first constant thickness using an eddy current sensor to generate eddy currents in the first calibration sample at a first plurality of known distances of the sensor from the first calibration sample to produce a first set of resistance loss values which are a function of the first plurality of distances of the sensor from the calibration sample and the known, first constant thickness of the calibration samples.

6. The method of claim 5 wherein a second set of data pairs and associated resistance loss values of said calibration data is generated by sensing a second calibration sample having a known, second constant thickness using an eddy current sensor to generate eddy currents in the second calibration sample at the first plurality of known distances of the sensor from the second calibration sample to produce a second set of resistance loss values which are a function of the first plurality of distances of the sensor from the calibration sample and the known, second constant thickness of the samples.

7. A method of measuring a test sample having a film of unknown thickness, comprising:
    oscillating the lift-off distance of an eddy current sensor displaced at an unknown distance from a test sample having a film of unknown thickness so that the lift-off distance between the sensor and the sample oscillates;
    sensing the test sample using the eddy current sensor to generate eddy currents in the sample while the lift-off distance oscillates to produce an oscillating sensor output signal;
    measuring the oscillating sensor output signal;
    comparing the oscillating sensor output signal measurements to calibration data; and
    determining at least one of the unknown distances of the sensor from the sample and the thickness of the film of the sample as a function of the comparison of the oscillating sensor output signal measurements to calibration data.

8. The method of claim 7 wherein the measuring includes measuring the amplitude and mean value of the oscillating sensor output signal.

9. The method of claim 7 wherein the calibration data correlates a plurality of measurements of output levels of a sensor output signal to a plurality of known thicknesses of a plurality of calibration samples and to a plurality of known distances of the calibration samples from an eddy current sensor.

10. The method of claim 7 wherein the oscillating the lift-off distance uses an oscillating piezo-electric transducer.

11. The method of claim 9 further comprising generating the calibration data, said generating comprising:
    oscillating the lift-off distance about a first known lift-off distance from a first calibration sample of a first known thickness so that the lift-off distance between the sensor and the first calibration sample oscillates about the first known distance;
    sensing the first calibration sample using the eddy current sensor to generate eddy currents in the first calibration sample while the lift-off distance oscillates about the first known distance to produce a first oscillating sensor calibration output signal;
    measuring the first oscillating sensor calibration output signal to produce a first set of calibration measurements associated with the first known calibration sample thickness and the first known distance;
    incrementing the lift-off distance between the eddy current sensor and the first calibration sample to a second known lift-off distance;
    oscillating the lift-off distance about, the second known lift-off distance from the calibration sample of known thickness so that the lift-off distance between the sensor and the first calibration sample oscillates about the second known lift-off distance;

sensing the calibration sample using the eddy current sensor to generate eddy currents in the first calibration sample while the lift-off distance oscillates about the second known distance to produce a second oscillating sensor calibration output signal;

measuring the second oscillating sensor calibration output signal to produce a second set of calibration measurements associated with the first known calibration sample thickness and the second known lift-off distance.

12. The method of claim 11 wherein said generating further comprises:

oscillating the position of the eddy current sensor about the first known lift-off distance from a second calibration sample of a second known thickness so that the lift-off distance between the sensor and the second calibration sample oscillates about the first known lift-off distance;

sensing the second calibration sample using the eddy current sensor to generate eddy currents in the second calibration sample while the lift-off distance oscillates about the first known distance to produce a third oscillating sensor calibration output signal;

measuring the third oscillating sensor calibration output signal to produce a third set of calibration measurements associated with the second known calibration sample thickness and the first known distance;

incrementing the distance between the eddy current sensor and the sample to the second known lift-off distance;

oscillating the lift-off distance about the second known distance from the second calibration sample of the second known thickness so that the lift-off distance between the sensor and the second calibration sample oscillates about the second known lift-off distance;

sensing the calibration sample using the eddy current sensor to generate eddy currents in the calibration sample while the lift-off distance oscillates about the second known lift-off distance to produce a fourth oscillating sensor calibration output signal; and measuring the fourth oscillating sensor calibration output signal to produce a fourth set of calibration measurements associated with the second known calibration sample thickness and the second known lift-off distance.

13. The method of claim 12 wherein the comparing includes comparing the oscillating sensor output signal measurements for the sample having the film of unknown thickness and unknown lift-off distance to the sets of calibration measurements.

14. The method of claim 7 further comprising generating sets of calibration data wherein each set of calibration data is generated at an associated lift-off distance oscillation amplitude selected from a plurality of lift-off distance oscillation amplitudes, selecting a test amplitude from the plurality of lift-off distance oscillation amplitudes wherein the oscillating the lift-off distance for the test sample oscillates at the selected test amplitude, and wherein the comparing the oscillating sensor output signal measurements to calibration data compares the oscillating sensor output signal measurements to a set of calibration data generated at an associated lift-off distance oscillation amplitude which is the same as the selected test amplitude.

15. A device for measuring a test sample having a film of unknown thickness, comprising:

an eddy current sensor adapted to sense a test sample at an unknown first distance from the test sample to generate eddy currents in the test sample to produce a sensor output signal of a single parameter at a first output level which is a function of the first unknown distance of the sensor from the test sample and the unknown thickness of the film of the test sample, and to sense the test sample using the eddy current sensor at a second unknown distance from the test sample to generate eddy currents in the test sample to produce a sensor output signal of the single parameter at a second output level which is a function of the second unknown distance of the sensor from the test sample and the unknown thickness of the film of the sample;

an actuator; and a controller adapted to control the actuator to increment the distance between the eddy current sensor and the test sample by a known incremental distance from the first unknown distance to the second unknown distance, wherein the controller further has a processor having storage storing calibration data correlating a plurality of measured output levels of a sensor output signal of the single parameter to a plurality of known thicknesses of films of a plurality of calibration samples and to a plurality of known distances of the calibration samples from an eddy current sensor, wherein the controller is adapted to control the processor to compare the sensor first and second output levels and the known incremental distance to the calibration data, and to determine at least one of the unknown distances of the sensor from the test sample and the thickness of the film of the test sample as a function of the comparison of the first and second sensor output levels of the single parameter and the known incremental distance to the calibration data.

16. The device of claim 15 wherein the controller is further adapted to increment the distance between the eddy current sensor, to cause the sensor to sense the test sample to produce another output signal of the single parameter at another output level at each incremented distance, and wherein the controller is further adapted to control the processor to compare the sensor output levels at each incremented distance to the calibration data, and determine the distance of the sensor from the test sample at each incremented distance, until the distance between the test sample and the sensor is determined to be at a predetermined distance.

17. The device of claim 15 wherein the single parameter is the resistance loss of a coil of the eddy current sensor as a result of interaction between the coil and the sample.

18. The device of claim 17 wherein the calibration data includes data representing a mapping of measured resistance loss values versus associated data pairs, each measured resistance value being the resistance loss value measured for a particular calibration sample of a known thickness at a known distance of the calibration sample from the sensor, each measured resistance loss value being mapped versus an associated data pair comprising the known thickness and the known distance of the calibration sample measured to produce the associated measured resistance loss value.

19. The device of claim 18 wherein the controller is adapted to generate a first set of data pairs and associated resistance loss values of said calibration data by causing the sensor to sense a first calibration sample having a known, first constant thickness to generate eddy currents in the first calibration sample at a first plurality of known distances of the sensor from the first calibration sample to produce a first set of resistance loss values which are a function of the first plurality of distances of the sensor from the calibration sample and the known, first constant thickness of the calibration samples.

20. The device of claim 19 wherein the controller is adapted to generate a second set of data pairs and associated resistance loss values of said calibration data by causing the sensor to sense a second calibration sample having a known, second constant thickness using an eddy current sensor to generate eddy currents in the second calibration sample at the first plurality of known distances of the sensor from the second calibration sample to produce a second set of resistance loss values which are a function of the first plurality of distances of the sensor from the calibration sample and the known, second constant thickness of the samples.

21. A device for measuring a test sample having a film of unknown thickness, comprising:
a controller;
an eddy current sensor responsive to the controller;
a sensing circuit responsive to the controller;
a processor responsive to the controller, and having storage storing calibration data;
an oscillating actuator responsive to the controller;
wherein the controller is adapted to control the oscillating actuator to oscillate the lift-off distance between the eddy current sensor displaced at an unknown nominal distance from a test sample having a film of unknown thickness so that the lift-off distance between the sensor and the sample oscillates, to control the eddy current sensor to sense the test sample to generate eddy currents in the sample while the lift-off distance oscillates to produce an oscillating sensor output signal, to control the sensing circuit to measure the oscillating sensor output signal to provide oscillating sensor output signal measurements, to control the processor to compare the oscillating sensor output signal measurements to the calibration data, and to determine at least one of the unknown nominal distance of the sensor from the sample and the thickness of the film of the sample as a function of the comparison of the oscillating sensor output signal measurements to the calibration data.

22. The device of claim 21 wherein the sensing circuit is adapted to measure the amplitude and mean value of the oscillating sensor output signal.

23. The device of claim 21 wherein the calibration data correlates a plurality of measurements of output levels of a sensor output signal to a plurality of known thicknesses of a plurality of calibration samples and to a plurality of known nominal distances of the calibration samples from an eddy current sensor.

24. The device of claim 21 wherein the oscillating actuator includes a piezo-electric transducer.

25. The device of claim 23 further comprising a linear actuator, wherein the controller is adapted to generate the calibration data, wherein said controller is adapted to:
control the oscillating actuator to oscillate the lift-off distance about a first known nominal lift-off distance from a first calibration sample of a first known thickness so that the lift-off distance between the sensor and the first calibration sample oscillates about the first known distance;
control the sensor to sense the first calibration sample to generate eddy currents in the first calibration sample while the lift-off distance oscillates about the first known nominal lift-off distance to produce a first oscillating sensor calibration output signal;
control, the sensing circuit to measure the first oscillating sensor calibration output signal to produce a first set of calibration measurements associated with the first known calibration sample thickness and the first known nominal lift-off distance;
control the linear actuator to increment the lift-off distance between the eddy current sensor and the first calibration sample to a second known nominal lift-off distance;
control the oscillating actuator to oscillate the lift-off distance about the second known nominal lift-off distance from the calibration sample of known thickness so that the lift-off distance between the sensor and the first calibration sample oscillates about the second known nominal lift-off distance;
control the sensing circuit to sense the calibration to generate eddy currents in the first calibration sample while the lift-off distance oscillates about the second known nominal lift-off distance to produce a second oscillating sensor calibration output signal; and
control the sensing circuit to measure the second oscillating sensor calibration output signal to produce a second set of calibration measurements associated with the first known calibration sample thickness and the second known nominal lift-off distance.

26. The device of claim 25 wherein said controller is adapted to:
control the oscillating actuator to oscillate the lift-off distance about the first known lift-off distance from a second calibration sample of a second known thickness so that the lift-off distance between the sensor and the second calibration sample oscillates about the first known lift-off distance;
control the sensor to sense the second calibration sample to generate eddy currents in the second calibration sample while the lift-off distance oscillates about the first known distance to produce a third oscillating sensor calibration output signal;
control the sensing circuit to measure the third oscillating sensor calibration output signal to produce a third set of calibration measurements associated with the second known calibration sample thickness and the first known nominal lift-off distance;
control the linear actuator to increment the distance between the eddy current sensor and the sample to the second known nominal lift-off distance;
control the oscillating actuator to oscillate the lift-off distance about the second known nominal lift-off distance from the second calibration sample of the second known thickness so that the lift-off distance between the sensor and the second calibration sample oscillates about the second known lift-off distance;
control the sensing circuit to sense the second calibration sample to generate eddy currents in the second calibration sample while the lift-off distance oscillates about the second known nominal lift-off distance to produce a fourth oscillating sensor calibration output signal; and
control the sensing circuit to measure the fourth oscillating sensor calibration output signal to produce a fourth set of calibration measurements associated with the second known calibration sample thickness and the second known nominal lift-off distance.

27. The device of claim 26 wherein the controller is further adapted to control the processor to compare the oscillating sensor output signal measurements for the sample having the film of unknown thickness and unknown lift-off distance to the generated sets of calibration measurements.

28. The device of claim 21 wherein the controller is further adapted to generate sets of calibration data wherein each set of calibration data is generated at an associated lift-off distance oscillation amplitude selected from a plurality of lift-off distance oscillation amplitudes, to control the oscillating actuator to oscillate the lift-off distance for the test-sample at a selected test amplitude selected from the plurality of lift-off distance oscillation amplitudes, and to control the processor to compare the oscillating sensor output signal measurements to a set of calibration data generated at an associated lift-off distance oscillation amplitude which is the same as the selected test amplitude.

29. A computer program product for use with a controller, an eddy current sensor responsive to the controller, a sensing circuit responsive to the controller, a processor responsive to the controller, and having storage for storing calibration data, an actuator responsive to the controller, and a test sample having a film of unknown thickness, the computer program product comprising a non-transitory computer readable storage medium having computer readable program code embodied therein that executes to perform operations by the controller, the operations comprising:

controlling the eddy current sensor to sense the test sample at an unknown first distance from the test sample to generate eddy currents in the test sample to produce a sensor output signal of a single parameter at a first output level which is a function of the first unknown distance of the sensor from the test sample and the unknown thickness of the film of the test sample;

controlling the actuator to increment the distance between the eddy current sensor and the test sample by a known incremental distance to a second unknown distance;

controlling the eddy current sensor to sense the test sample at the second unknown distance from the test sample to generate eddy currents in the test sample to produce a sensor output signal of the single parameter at a second output level which is a function of the second unknown distance of the sensor from the test sample and the unknown thickness of the film of the sample; controlling the processor to compare the sensor first and second output levels and the known incremental distance to calibration data correlating a plurality of measured output levels of a sensor output signal of the single parameter to a plurality of known thicknesses of films of a plurality of calibration samples and to a plurality of known distances of the calibration samples from the eddy current sensor; and controlling the processor to determine at least one of the unknown distances of the sensor from the test sample and the thickness of the film of the test sample as a function of the comparison of the first and second sensor output levels of the single parameter and the known incremental distance to the calibration data.

30. The computer program product of claim 29 wherein the operations further comprise:

controlling the actuator to increment the distance between the eddy current sensor and the test sample;

controlling the sensor to sense the test sample to produce another output signal of the single parameter at another output level at each incremented distance; and controlling the processor to compare the sensor output levels at each incremented distance to the calibration data, and determine the distance of the sensor from the test sample at each incremented distance, until the distance between the test sample and the sensor is determined to be at a predetermined distance.

31. The computer program product of claim 29 wherein the single parameter is the resistance loss of a coil of the eddy current sensor as a result of interaction between the coil and the sample.

32. The computer program product of claim 31 wherein the calibration data includes data representing a mapping of measured resistance loss values versus associated data pairs, each measured resistance value being the resistance loss value measured for a particular calibration sample of a known thickness at a known distance of the calibration sample from the sensor, each measured resistance loss value being mapped versus an associated data pair comprising the known thickness and the known distance of the calibration sample measured to produce the associated measured resistance loss value.

33. The computer program product of claim 32 wherein the operations further comprise:

generating a first set of data pairs and associated resistance loss values of said calibration data, said generating operation including:

controlling the sensor to sense a first calibration sample having a known, first constant thickness to generate eddy currents in the first calibration sample at a first plurality of known distances of the sensor from the first calibration sample to produce a first set of resistance loss values which are a function of the first plurality of distances of the sensor from the calibration sample and the known, first constant thickness of the calibration samples.

34. The computer program product of claim 33 wherein the operations further comprise:

generating a second set of data pairs and associated resistance loss values of said calibration data, said second set generating operation including:

controlling the sensor to sense a second calibration sample having a known, second constant thickness to generate eddy currents in the second calibration sample at the first plurality of known distances of the sensor from the second calibration sample to produce a second set of resistance loss values which are a function of the first plurality of distances of the sensor from the calibration sample and the known, second constant thickness of the samples.

35. A computer program product for use with a controller, an eddy current sensor responsive to the controller, a sensing circuit responsive to the controller, a processor responsive to the controller, and having storage for storing calibration data, an actuator responsive to the controller, and a test sample having a film of unknown thickness, the computer program product comprising a non-transitory computer readable storage medium having computer readable program code embodied therein that executes to perform operations by the controller, the operations comprising:

controlling the actuator to oscillate the lift-off distance between the eddy current sensor displaced at an unknown nominal distance from a test sample having a film of unknown thickness so that the lift-off distance between the sensor and the sample oscillates;

controlling the eddy current sensor to sense the test sample to generate eddy currents in the sample while the lift-off distance oscillates to produce an oscillating sensor output signal;

controlling the sensing circuit to measure the oscillating sensor output signal to provide oscillating sensor output signal measurements;

controlling the processor to compare the oscillating sensor output signal measurements to the calibration data, and to determine at least one of the unknown nominal distance of the sensor from the sample and the thickness of the film of the sample as a function of the comparison of the oscillating sensor output signal measurements to the calibration data.

36. The computer program product of claim 35 wherein the operations further comprise:

controlling the sensing circuit to measure the amplitude and mean value of the oscillating sensor output signal.

37. The computer program product of claim 35 wherein the calibration data correlates a plurality of measurements of output levels of a sensor output signal to a plurality of known thicknesses of a plurality of calibration samples and to a plurality of known nominal distances of the calibration samples from an eddy current sensor.

38. The computer program product of claim 35 wherein the actuator includes a piezo-electric transducer.

39. The computer program product of claim 37 further for use with a linear actuator, wherein the operations further comprise:
generating the calibration data, wherein the generating operations comprise:
controlling the oscillating actuator to oscillate the lift-off distance about a first known nominal lift-off distance from a first calibration sample of a first known thickness so that the lift-off distance between the sensor and the first calibration sample oscillates about the first known distance;
controlling the sensor to sense the first calibration sample to generate eddy currents in the first calibration sample while the lift-off distance oscillates about the first known nominal lift-off distance to produce a first oscillating sensor calibration output signal;
controlling the sensing circuit to measure the first oscillating sensor calibration output signal to produce a first set of calibration measurements associated with the first known calibration sample thickness and the first known nominal lift-off distance;
controlling the linear actuator to increment the lift-off distance between the eddy current sensor and the first calibration sample to a second known nominal lift-off distance;
controlling the oscillating actuator to oscillate the lift-off distance about the second known nominal lift-off distance from the calibration sample of known thickness so that the lift-off distance between the sensor and the first calibration sample oscillates about the second known nominal lift-off distance;
controlling the sensing circuit to sense the calibration to generate eddy currents in the first calibration sample while the lift-off distance oscillates about the second known nominal lift-off distance to produce a second oscillating sensor calibration output signal; and
controlling the sensing circuit to measure the second oscillating sensor calibration output signal to produce a second set of calibration measurements associated with the first known calibration sample thickness and the second known nominal lift-off distance.

40. The computer program product of claim 39 wherein the operations further comprise:
controlling the oscillating actuator to oscillate the lift-off distance about the first known lift-off distance from a second calibration sample of a second known thickness so that the lift-off distance between the sensor and the second calibration sample oscillates about the first known lift-off distance;
controlling the sensor to sense the second calibration sample to generate eddy currents in the second calibration sample while the lift-off distance oscillates about the first known distance to produce a third oscillating sensor calibration output signal;
controlling the sensing circuit to measure the third oscillating sensor calibration output signal to produce a third set of calibration measurements associated with the second known calibration sample thickness and the first known nominal lift-off distance;
controlling the linear actuator to increment the distance between the eddy current sensor and the sample to the second known nominal lift-off distance;
controlling the oscillating actuator to oscillate the lift-off distance about the second known nominal lift-off distance from the second calibration sample of the second known thickness so that the lift-off distance between the sensor and the second calibration sample oscillates about the second known lift-off distance;
controlling the sensing circuit to sense the second calibration sample to generate eddy currents in the second calibration sample while the lift-off distance oscillates about the second known nominal lift-off distance to produce a fourth oscillating sensor calibration output signal; and
controlling the sensing circuit to measure the fourth oscillating sensor calibration output signal to produce a fourth set of calibration measurements associated with the second known calibration sample thickness and the second known nominal lift-off distance.

41. The computer program product of claim 40 wherein the operations further comprise:
controlling the processor to compare the oscillating sensor output signal measurements for the sample having the film of unknown thickness and unknown lift-off distance to the generated sets of calibration measurements.

42. The computer program product of claim 35 wherein, the operations further comprise:
controlling the actuator, eddy current sensor, sensing circuit and processor to generate sets of calibration data wherein each set of calibration data is generated at an associated lift-off distance oscillation amplitude selected from a plurality of lift-off distance oscillation amplitudes, controlling the oscillating actuator to oscillate the lift-off distance for the test sample at a selected test amplitude selected from the plurality of lift-off distance oscillation amplitudes, and controlling the processor to compare the oscillating sensor output signal measurements to a set of calibration data generated at an associated lift-off distance oscillation amplitude which is the same as the selected test amplitude.

* * * * *